US010861326B2

(12) United States Patent
Chun et al.

(10) Patent No.: US 10,861,326 B2
(45) Date of Patent: Dec. 8, 2020

(54) METHOD AND DEVICE FOR SHARING IMAGE INFORMATION IN COMMUNICATION SYSTEM

(71) Applicant: SAMSUNG ELECTRONICS CO., LTD., Suwon-si (KR)

(72) Inventors: Hae-in Chun, Suwon-si (KR); Jung-Gap Kuk, Seoul (KR); Hyun-Jeong Kang, Seoul (KR); In-Hak Na, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 175 days.

(21) Appl. No.: 16/068,307

(22) PCT Filed: Jan. 5, 2017

(86) PCT No.: PCT/KR2017/000137
§ 371 (c)(1),
(2) Date: Jul. 5, 2018

(87) PCT Pub. No.: WO2017/119737
PCT Pub. Date: Jul. 13, 2017

(65) Prior Publication Data
US 2019/0012908 A1    Jan. 10, 2019

(30) Foreign Application Priority Data
Jan. 5, 2016    (KR) .................. 10-2016-0000951

(51) Int. Cl.
*G08G 1/01*        (2006.01)
*G06K 9/00*        (2006.01)
(Continued)

(52) U.S. Cl.
CPC ....... *G08G 1/0141* (2013.01); *G01C 21/3492* (2013.01); *G01S 19/42* (2013.01);
(Continued)

(58) Field of Classification Search
None
See application file for complete search history.

(56) References Cited

U.S. PATENT DOCUMENTS 10,348,888 B1 * 7/2019 Arnold .............. H04M 3/42042
10,394,253 B1 * 8/2019 Loo .................. G08G 1/096883
(Continued)

FOREIGN PATENT DOCUMENTS

JP    2012-198599 A    10/2012
JP    2015-28711 A      2/2015
(Continued)

OTHER PUBLICATIONS

International Search Report dated Apr. 10, 2017, issued by the International Searching Authority in counterpart International Patent Application No. PCT/KR2017/000137 (PCT/ISA/210).
(Continued)

*Primary Examiner* — Richard M Camby
(74) *Attorney, Agent, or Firm* — Sughrue Mion, PLLC

(57) ABSTRACT

In a method for sharing driving images of a second vehicle by a first terminal, which communicates with a first vehicle, in a communication system, the present invention comprises the steps of: storing routes by time of the first vehicle; receiving a first message, for notifying an occurrence of an accident or a hazardous situation, from an electronic device of the first vehicle; if the first message is received, selecting a first route of predetermined time from the stored routes; and transmitting a second message for requesting image information related to the first route among the driving images of the second vehicle.

10 Claims, 20 Drawing Sheets

(51) Int. Cl.
  *G08G 1/017* (2006.01)
  *G06K 9/32* (2006.01)
  *G01S 19/42* (2010.01)
  *G01C 21/34* (2006.01)
  *G07C 5/00* (2006.01)
  *G08G 1/04* (2006.01)
  *H04N 7/04* (2006.01)
  *H04N 7/18* (2006.01)
  *G07C 5/08* (2006.01)
  *H04W 4/46* (2018.01)
  *H04W 4/90* (2018.01)
  *H04W 4/02* (2018.01)
  *G06T 7/50* (2017.01)
  *G06T 7/70* (2017.01)

(52) U.S. Cl.
  CPC ....... *G06K 9/00791* (2013.01); *G06K 9/3233* (2013.01); *G07C 5/008* (2013.01); *G08G 1/0112* (2013.01); *G08G 1/0116* (2013.01); *G08G 1/0125* (2013.01); *G08G 1/0129* (2013.01); *G08G 1/0175* (2013.01); *G08G 1/04* (2013.01); *H04N 7/04* (2013.01); *H04N 7/183* (2013.01); *G06T 7/50* (2017.01); *G06T 7/70* (2017.01); *G06T 2207/30236* (2013.01); *G06T 2207/30241* (2013.01); *G06T 2207/30252* (2013.01); *G07C 5/0866* (2013.01); *H04W 4/02* (2013.01); *H04W 4/46* (2018.02); *H04W 4/90* (2018.02)

(56) References Cited

U.S. PATENT DOCUMENTS

2002/0198632 A1* 12/2002 Breed .................... G08G 1/164
                                                                                701/1
2004/0034464 A1*  2/2004 Yoshikawa ...... G08G 1/096716
                                                                              701/117
2009/0105902 A1    4/2009 Choi et al.

FOREIGN PATENT DOCUMENTS

KR   10-2014-0077630 A   6/2014
KR   10-2014-0099787 A   8/2014

OTHER PUBLICATIONS

Written Opinion dated Apr. 10, 2017, issued by the International Searching Authority in counterpart International Patent Application No. PCT/KR2017/000137 (PCT/ISA/237).

* cited by examiner

METHOD AND DEVICE FOR SHARING IMAGE INFORMATION IN COMMUNICATION SYSTEM

CROSS-REFERENCE TO RELATED APPLICATION

This application is a National Phase Entry of PCT International Application No. PCT/KR2017/000137, which was filed on Jan. 5, 2017, and claims priority to Korean Patent Application No. 10-2016-0000951, which was filed on Jan. 5, 2016, the contents of which are incorporated herein by reference.

BACKGROUND

1. Field

The present disclosure relates to a method and apparatus for sharing image information in a communication system, and more particularly, to a method and apparatus for sharing image information related to a vehicle in a communication system supporting a vehicle to vehicle (V2V) scheme.

2. Description of Related Art

Various researches are underway to realize a communication network between vehicles which drive on a road according to development of a communication technology. An example of a communication technology using a vehicle is a V2V communication which the Department of Transportation will apply from 2016. The V2V communication is a communication technology which has been proposed such that vehicle information for safe driving among vehicles may be transmitted and received using a wireless communication. The vehicle information may include, for example, a location, a speed, and a brake state of a vehicle, a vehicle size, and/or the like, and neighbor vehicles which are driving may periodically exchange a message including the vehicle information to use the message for preventing a traffic accident.

Meanwhile, a vehicle of which a traffic accident occurs may identify image information which is captured when the traffic accident occurs using a driving image recorder such as a black box, and/or the like mounted on the vehicle. However, it is difficult to determine an accurate reason of the accident and whether there is negligence only using the image which is captured using the black box, and/or the like. Further, an image captured through a black box of a neighbor vehicle adjacent to a user's vehicle may be help of determining an accident reason and whether there is negligence, however, the neighbor vehicle is out of a scene of an accident immediately after the traffic accident, so it is practically difficult to obtain the image captured through the black box of the neighbor vehicle. So, there is a need for a scheme for more easily obtaining an image captured around a user's vehicle for checking an accident reason when a traffic accident occurs, or for preventing various accidents before the various accidents occur.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes a method and apparatus for sharing image information in a communication system.

An embodiment of the present disclosure proposes a method and apparatus for effectively sharing image information related to a vehicle in a communication system supporting a V2V scheme.

An embodiment of the present disclosure proposes a method and apparatus for sharing image information related to an accident vehicle among vehicles in a communication system supporting a V2V scheme.

An embodiment of the present disclosure proposes a method and apparatus for sharing image information among vehicles for preventing an accident in a communication system supporting a V2V scheme.

A method, which is proposed in an embodiment of the present disclosure, for sharing a driving image of a second vehicle in a first terminal that communicates with a first vehicle in a communication system includes storing a moving route by time of the first vehicle, receiving a first message for notifying an occurrence of an accident or a hazardous situation from an electronic device of the first vehicle, upon receiving the first message, selecting a first moving route for predetermined time from the stored moving route, and transmitting a second message for requesting image information related to the first moving route among the driving image of the second vehicle.

A terminal, which is proposed in an embodiment of the present disclosure, for sharing a driving image of a neighbor vehicle in a communication system includes at least one processor configured to store a moving route by time of a first vehicle which communicates with the terminal, to receive a first message for notifying an occurrence of an accident or a hazardous situation from an electronic device of the first vehicle, to select a first moving route for predetermined time from the stored moving route upon receiving the first message, and to transmit a second message for requesting image information related to the first moving route among the driving image of the second vehicle.

A method, which is proposed in an embodiment of the present disclosure, for sharing a driving image with a first terminal which communicates with a first vehicle in a second terminal which communicates with a second vehicle in a communication system includes receiving a second message for requesting image information related to a first moving route of the first vehicle among a driving image of the second vehicle from the first vehicle if the first terminal receives a first message for notifying an occurrence of an accident or a hazardous situation from an electronic device of the first vehicle, and transmitting the image information which is selected based on the first moving route among the driving image.

A terminal, which is proposed in an embodiment of the present disclosure and which communicates with a second vehicle, for sharing a driving image with a first terminal which communicates with a first vehicle in a communication system includes at least one processor configured to receive a second message for requesting image information related to a first moving route of the first vehicle among a driving image of the second vehicle from the first vehicle if the first terminal receives a first message for notifying an occurrence of an accident or a hazardous situation from an electronic device of the first vehicle, and to the image information which is selected based on the first moving route among the driving image.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
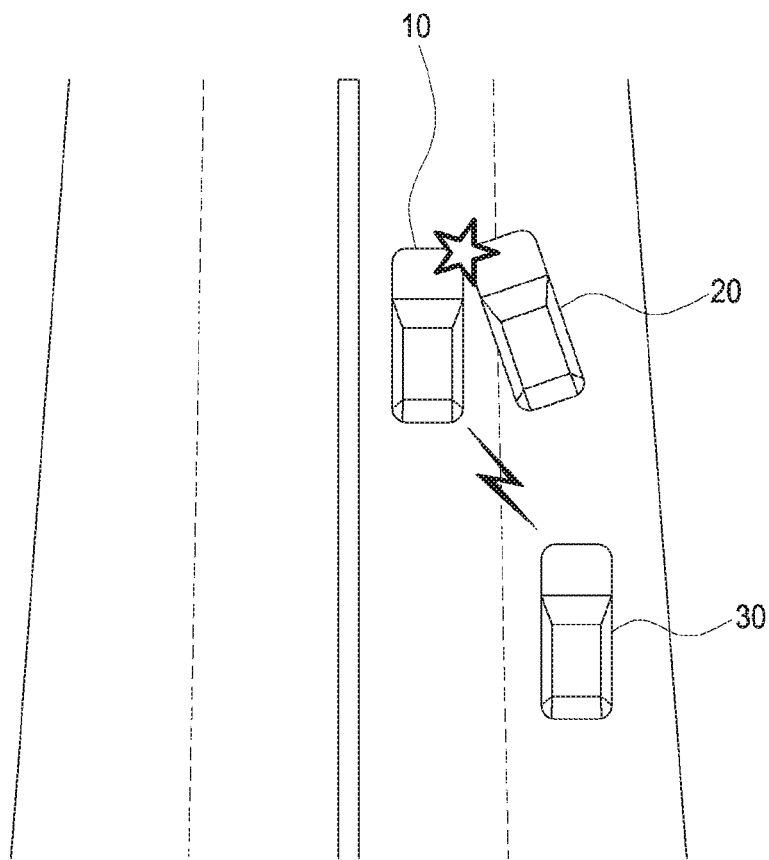
FIG. 1 schematically illustrates an example of a method of sharing image information related to the first vehicle in a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes a method and apparatus for sharing image information in a communication system.

An embodiment of the present disclosure proposes a method and apparatus for effectively sharing image information related to a vehicle in a communication system supporting a vehicle to vehicle (V2V) scheme.

An embodiment of the present disclosure proposes a method and apparatus for sharing image information related to an accident vehicle among vehicles in a communication system supporting a V2V scheme.

An embodiment of the present disclosure proposes a method and apparatus for sharing image information among vehicles for preventing an accident in a communication system supporting a V2V scheme.

According to various embodiments of the present disclosure, the term terminal may be interchangeable with the terms user equipment (UE), device, mobile station (MS), mobile device, subscriber station, and/or the like.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3rdgeneration partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

Terminologies used in various embodiments of the present disclosure will be described below.

In various embodiments of the present disclosure, "the first vehicle" is at least one vehicle to which a user's terminal is attached, which requests image information related to the first vehicle from another user's terminal, the second vehicle, an outer server, a Closed Circuit Television (CCTV), and/or the like according that a traffic accident occurs while driving or being stationary on a road, and/or the like, or an occurrence of various vehicle-related accidents is expected while driving or being stationary, and "the second vehicle" is at least one neighbor vehicle to which the another user's terminal is attached, which provides the image information related to the first vehicle based on a driving image captured by the second vehicle upon receiving the request for the image information from the terminal, the first vehicle, the outer server, the CCTV, and/or the like while driving or being stationary within a distance adjacent to the first vehicle.

If a function of the terminal is implemented within a vehicle, the request and provision for the image information may be directly performed through the first and the second vehicles. "Terminal" is a terminal which a user of the first vehicle and a user of the second vehicle use, and the terminal may be mounted a vehicle as well as various portable terminals such as a smart phone, a tablet PC, a phablet, a notebook computer, a laptop computer, and/or the like at which an application which transmits and receives image information related to the first vehicle through a wireless communication or a wired communication is installed and capture an image of an outer of the vehicle, and may use a black box, a navigation, an electronic device mounted within the vehicle, and/or the like at which the application may be installed.

The "wireless communication" may use various cellular wireless communication schemes such as an LTE scheme, an scheme LTE-A scheme, a CDMA scheme, a WCDMA scheme, a universal mobile telecommunications system (UMTS) scheme, a Wireless Broadband (WiBro) scheme, a Global System for Mobile Communications (GSM) scheme, an LTE-D2D scheme, an LTE-Vehicle to Everything (V2X) scheme as a wireless vehicle communication scheme, and/or the like as well as various short-range wireless communication schemes in which it is possible to transmit and receive image information within a short-range such as a V2V communication, a Vehicle to Infrastructure (V2I) communication, a Vehicle to Pedestrian (V2P) communication, a Device to Device (D2D) communication, a Wi-Fi communication, Bluetooth, Bluetooth Low Energy (BLE), a near field communication (NFC), Zigbee, Z-wave, infrared data association (IrDA), and/or the like.

Further, the V2V communication may use a short-range wireless communication scheme such as a Dedicated Short-Range Communications (DSRC) scheme and a cellular wireless communication scheme such as LTE-V2V.

The "wire communication" may use a communication which uses a cable. For example, a USB cable, and/or the like may be used as the cable.

Further, "CCTV" is a closed circuit TV including a camera which is installed on a road and may capture a driving image of a vehicle and a communication interface which may use the wireless communication. The CCTV may transmit and receive image information with the terminal or the outer server.

And, "accident message" is a message which the first vehicle which senses physical crash (i.e., an occurrence of an accident) of a vehicle due to various reasons such as a traffic accident or a landslide, a rockslide, a road state, and/or the like or predicts a situation of the vehicle before an accident occurs notifies the terminal of the occurrence of the accident or the hazardous situation.

In various embodiments of the present disclosure, "moving route" is a moving route of the terminal or a vehicle which communicates with the terminal, and includes location information by time of the terminal or the vehicle. That is, information at which a location of the terminal or the vehicle which communicates with the terminal is recorded at specific time (which date and which time) may be used as the moving route. The location information by time is location information which is recorded by time which is counted at the terminal or by time which is counted at the vehicle. The location information by time may be recorded by a predetermined time interval (e.g., by few seconds) or a time interval by which the location information by time is recorded may be differently determined according to a speed of the vehicle. (For example, if the speed of the vehicle is faster than a reference speed, a recording time interval may be shorter, and if the speed of the vehicle is slower than the reference speed, the recording time interval may be longer.) As described above, the time interval by which the location information by time is recorded may be set with various schemes. The location information by time may further include lane information by time of the vehicle.

At least one information which may indicate the location of the terminal or the vehicle which communicates with the terminal such as a latitude, a longitude, an altitude, a speed, GPS information, a driving road, a coordinate value on a map, a driving lane, a driving heading, and/or the like of the vehicle may be used as the location information. Various information which may indicate the location of the vehicle as well as the information as described above may be used as the location information. The location information may be location information which is measured using a Lidar, a Radar, a Global Positioning System (GPS) module, an Inertia Measurement Unit (IMU) as an inertia sensor, an odometry, a camera, and/or the like which are mounted on the terminal or the vehicle or location information which is recognized based on measured information.

For example, location information of a vehicle which is recognized by comparing a surface reflectivity within a map stored as the Lidar information may be used as the location information. "Driving image" which will use information received from an outer server denotes an image which is captured through the terminal or the vehicle corresponding to the moving route of the vehicle, and "image information" denotes image information related to the first vehicle which is captured through the terminal of the second vehicle or the CCTV and is image information where the first vehicle is captured selected from a driving image of the second vehicle based on a distance between the first vehicle and the second vehicle, a direction of the second vehicle to the first vehicle, and/or the like.

And, "integrated image" denotes an image where a plurality of image information are integrated such that the image information related to the first vehicle may be identified at various viewing angles. The plurality of image information may be integrated, for example, based on time, a location, and/or the like. In the integrated image, an image may be integrated based on time, a location, and/or the like at which the image is captured, so if the integrated image is used, image information related to a vehicle may be identified at various viewing angles.

For convenience of description, embodiments of the present disclosure to be described below will exemplify a method and apparatus for sharing image information related to the first vehicle among vehicles when a traffic accident occurs. However, a situation to which the present disclosure may be applied is not limited to the traffic accident, and may the present disclosure may be applied to a case of notifying a hazardous situation before the accident occurs in the same manner. For example, the present disclosure may be applied to a case of sharing image information for safe driving among vehicles. The present disclosure may be applied to a case of avoiding an object which may cause an accident on a road, or preventing a hazard for the following vehicle when a landslide, a rockslide, and/or the like occurs. A method of transmitting and receiving image information of the present disclosure may be applied, with the same or similar manner, to various transportation means which operate according to a determined moving route such as a vessel, an aircraft, and/or the like as well as a vehicle.

An example of a method of sharing image information related to the first vehicle in a communication system according to an embodiment of the present disclosure will be described with reference to FIG. 1.

FIG. 1 schematically illustrates an example of a method of sharing image information related to the first vehicle in a communication system according to an embodiment of the present disclosure.

Referring to FIG. 1, a situation that the first vehicle 10 collide with another vehicle 20 and a traffic accident occurs will be assumed. It will be assumed that the second vehicle 30 is driving within an adjacent distance where an accident image of the first vehicle 10 may be captured. A user terminal of each of the first vehicle 10 and the second vehicle 30 captures and stores a driving image of a corresponding vehicle, and records and stores a moving route according to driving of the corresponding vehicle. When an accident occurs due to various reasons as described above, the first vehicle 10 senses physical crash of the first vehicle 10 through a crash sensor mounted on an electronic device of the first vehicle 10. A terminal of the first vehicle 10 receives an accident message for notifying an occurrence of an accident from the first vehicle 10. The terminal of the first vehicle 10 requests image information related to a moving route of the first vehicle 10 from the second vehicle 30 through a wireless communication. After receiving the request for the image information, the terminal of the second vehicle 30 selects image information related to the moving route of the first vehicle 10 from a driving image of the second vehicle 30 based on at least one of a distance and a direction from the first vehicle 10, and whether the second vehicle 30 exists on the same road with the first vehicle 10, and transmits the selected image to the terminal of the first vehicle 10 through a wireless communication. The information which may be used as the basis (a distance, a direction, whether to exist on the same road, and/or the like) for the terminal of the second vehicle 30 to select the image information related to the moving route of the first vehicle 10 is an example, and other information may be used. According to an embodiment as described above, the first vehicle 10 may easily receive image information for the first vehicle 10 from the second vehicle 30 when a traffic accident occurs.

For convenience of description, an embodiment in FIG. 1 describes an example in which the first vehicle 10 requests image information from the second vehicle 30, and the second vehicle 30 may request image information from the another vehicle 20. The another vehicle 20 may also request image information from the second vehicle 30 or the first vehicle 10 with the same manner.

An example of a method of sharing image information related to the first vehicle in a communication system according to an embodiment of the present disclosure has been described with reference to FIG. 1, and an inner structure of a terminal in a communication system according to an embodiment of the present disclosure will be described with reference to FIG. 2a.

Figure 2A:
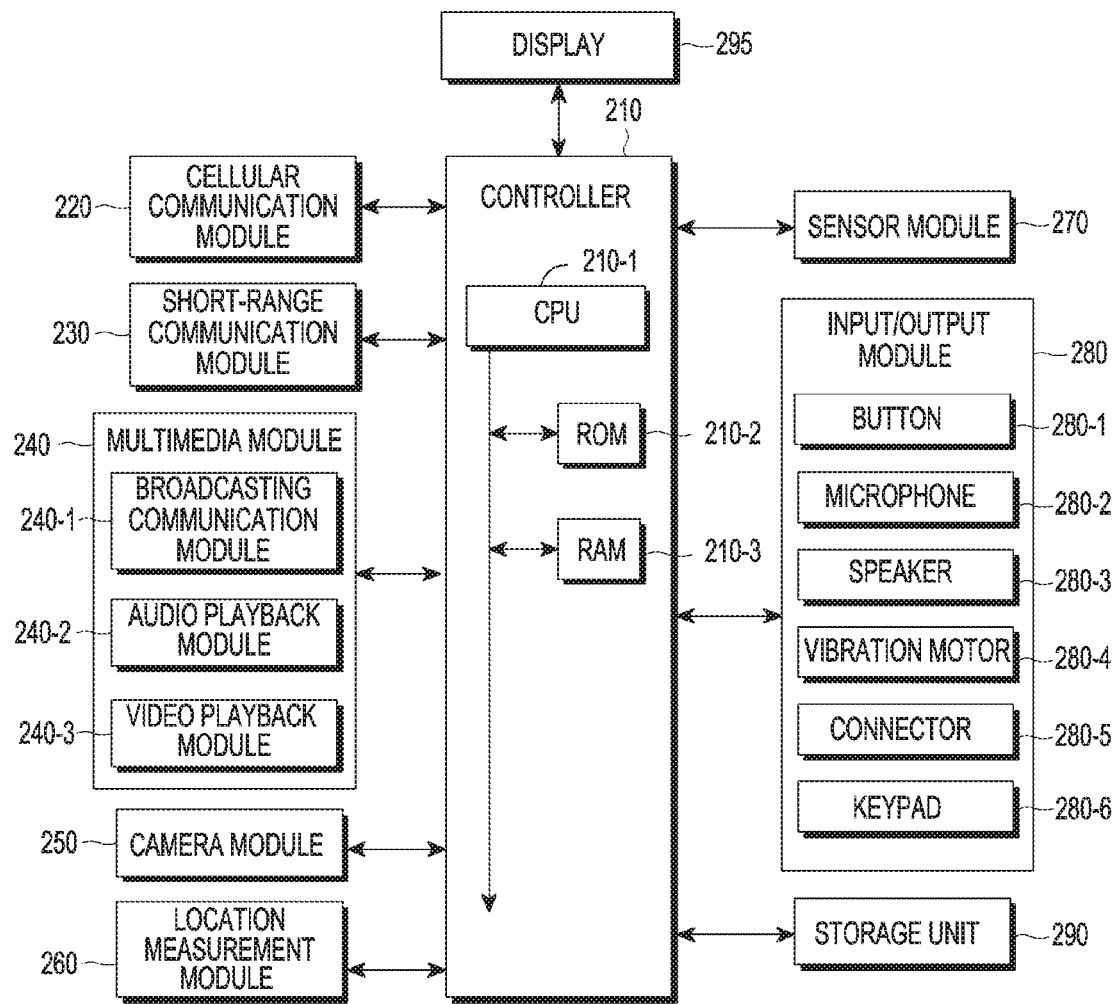
FIG. 2a schematically illustrates an inner structure of a terminal in a communication system according to an embodiment of the present disclosure.

FIG. 2a schematically illustrates an inner structure of a terminal in a communication system according to an embodiment of the present disclosure.

Referring to FIG. 2a, a terminal includes a controller 210, a cellular communication module 220, a short-range communication module 230, a multimedia module 240, a camera module 250, a location measurement module 260, a sensor module 270, an input/output module 280, a storage unit 290, and a display 295. A cellular communication module 220 includes at least one of communication interfaces for various cellular communications which have been exemplified in the start portion of the detailed description. The short-range communication module 230 includes at least one of communication interfaces for various short-range communications which have been exemplified in the start portion of the detailed description.

A terminal as shown in FIG. 2a may perform a communication with a neighbor vehicle, a road facility such as a CCTV, and/or the like, an outer server, and/or the like through the cellular communication module 220 or the short-range communication module 230 to transmit and receive image information related to a vehicle, and to communicate a voice call, a video call, and a message such as a Short Messaging Service (SMS) message, a Multimedia Messaging Service (MMS) message, and/or the like.

The terminal as shown in FIG. 2a may transmit and receive a wireless signal including short data such as various control information, and/or the like for controlling an application through the cellular communication module 220 or the short-range communication module 230. The application includes program codes for performing an operation of transmitting and receiving the image information related to the first vehicle according to a method of at least one of embodiments to be described. The location measurement module 260 may include at least one of various location measurement devices such as a Lidar, a Radar, a GPS module, an IMU, an odometry, a camera, and/or the like which may be used for measuring location information by time included in a moving route of a vehicle as described above. In FIG. 2a, the multimedia module 240 includes at least one of a broadcasting communication module 240-1, an audio playback module 240-2, and a video playback module 240-3. The camera module 250 includes at least one camera, and captures a driving image of a vehicle under a control of the controller 210. The input/output module 280 includes at least one of a button 280-1, a microphone 280-2, a speaker 280-3, a vibration motor 280-4, a connector 280-5, and a keypad 280-6 for performing various functions. The connector 280-5 may include a communication interface between a terminal and a vehicle for a connected car. The controller 210 includes a CPU 210-1, a ROM 210-2 where a control program for controlling a terminal is stored, and a RAM 210-3 which temporally memories a signal or data input from the outside, or which is uses as a memory area for an operation performed in the terminal, and controls other components of the terminal.

The controller 210 may connect to an internet at a place where a wireless access point (AP) (not shown) through the cellular communication module 220 or the short-range communication module 230.

So, an outer server such as a cloud server, a server of a traffic control surveillance center, and/or the like which are connected to an internet (or a dedicated network) may be used for transmitting and receiving image information according to an embodiment of the present disclosure. The cloud server may use a data storage server which a vehicle (or a terminal related to the vehicle) uses (or subscribes). The outer server may perform an operation of regenerating an image such as an operation of up-scaling or down-scaling resolution of image information, and/or the like. For example, the outer server may regenerate image information received through a terminal or a CCTV as an image with high resolution or low resolution to provide the image with the high resolution or the low resolution on a WEB or to the terminal or another server. The outer server may generate an integrated image by integrating at least one received image information, and may equip a function of correcting image information such that an image of a vehicle which is captured may be exactly shown.

Referring back to FIG. 2a, the display 295 may display information of various applications (e.g., a call, data transmission, broadcasting, a camera, and/or the like) including an application for transmitting and receiving the image information related to the first vehicle under a control of the controller 210 (hereinafter, "vehicle application"). The display 295 may include a touch screen which provides a user interface for an operation of each application with a contact input scheme. The controller 210 may select a soft key displayed on the touch screen or perform a corresponding application or a related function which corresponds to the soft key in response to a user's gesture sensed on the touch screen. The user's gesture includes touch by a finger or an equipment, recognition of motion by a human body, and/or the like. The vehicle application is installed at the ROM 210-2 or the storage unit 290, and may provide a user interface screen for transmitting and receiving the image information according to a gesture input using user's key input and touch input, an acceleration sensor, a gyro sensor, and/or the like if the vehicle application is run.

The controller 210 may control an operation of generating at least one of a driving image, a moving route, image information related to the first vehicle, and an integration image in which a plurality of image information is integrated according to an operation routine of the vehicle application, and the storage unit 290 may store at least one of the generated driving image, moving route, image information related to the first vehicle, and integrated image. Each vehicle which uses the vehicle application may be identified using unique identification information. In this case, at least one terminal of at least one first vehicle may transmit and receive image information related to the at least one first vehicle with at least one terminal of at least one second vehicle using the identification information. The terminal in FIG. 2a may include a controller for controlling an operation of transmitting and receiving the image information and a transceiver for transmitting and receiving data according to embodiments to be described below.

Although the controller 210, the cellular communication module 220, the short-range module 230, the multimedia module 240, the camera module 250, the location measurement module 260, the sensor module 270, the input/output module 280, the storage unit 290, and the display 295 are described as separate units in the terminal in FIG. 2a, it is to be understood that the terminal may be implemented with a form into which at least two of the controller 210, the cellular communication module 220, the short-range module 230, the multimedia module 240, the camera module 250, the location measurement module 260, the sensor module 270, the input/output module 280, the storage unit 290, and the display 295 are incorporated.

The terminal may be implemented with at least one processor. That is, the terminal may be implemented with a form which includes at least one of modules as shown in FIG. 2a.

An inner structure of a terminal in a communication system according to an embodiment of the present disclosure has been described with reference to FIG. 2a, and an inner structure of an electronic device mounted within a vehicle in a communication system according to an embodiment of the present disclosure will be described with reference to FIG. 2b.

Figure 2B:
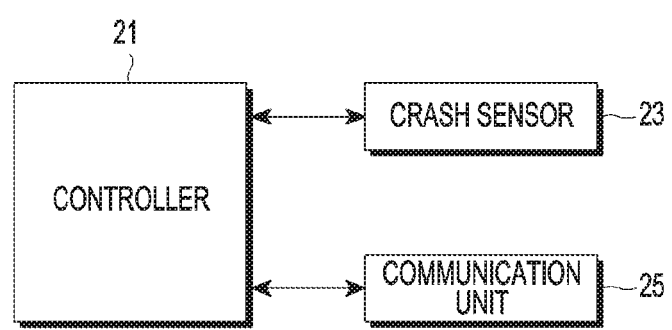
FIG. 2b schematically illustrates an inner structure of an electronic device mounted within a vehicle in a communication system according to an embodiment of the present disclosure.

FIG. 2b schematically illustrates an inner structure of an electronic device mounted within a vehicle in a communication system according to an embodiment of the present disclosure.

Referring to FIG. 2b, the electronic device includes a controller 21 for performing overall control related to driving of a vehicle, a crash sensor 23 for sensing physical crash for the vehicle, and a communication unit 25 for a wireless or wired communication between a terminal in FIG. 2a and the electronic device.

The controller 21 may be implemented in an Electronic control unit (ECU), and/or the like mounted within a vehicle. The communication unit 25 may use at least one communication scheme for various wireless or wired communications which has been described at the start portion of the detailed description. The crash sensor 23 notifies the controller 21 of an occurrence of physical crash upon sensing the physical crash of a vehicle. At this time, the crash sensor 23 may notify the occurrence of the physical crash if an acceleration value or pressure of the vehicle is equal to or greater than a determined value. An accelerometer crash sensor which reads an acceleration value of a vehicle by a predetermined period, and senses that crash occurs if the acceleration value of the vehicle is equal to or greater than a predetermined acceleration, and a pressure sensor such as a piezo sensor which senses that the crash occurs if pressure applied to the vehicle is equal to or greater than predetermined pressure, and/or the like may be used as the crash sensor 23. For convenience of description, one crash sensor 23 is shown in FIG. 2b, however, a plurality of crash sensors may be installed at the front, the side, the rear, and/or the like of the vehicle. If the plurality of crash sensors are installed, the accelerometer crash sensor may be used with the pressure sensor. In FIG. 2b, the controller 21 transmits the accident message through the communication unit 25 upon receiving a signal indicating that physical crash of a vehicle is sensed from the crash sensor 23, and the terminal in FIG. 2a determines that an accident due to physical crash such as a traffic accident, and/or the like occurs upon receiving the accident message from the electronic device in FIG. 2b, and performs a communication with the terminal of the second vehicle for transmitting and receiving image information. The accident message may be used for the controller 21 which predicts a hazardous situation of a vehicle due to various reasons such as a landslide, a rockslide, a road state, and/or the like to notify a terminal of the hazardous situation. In this case, even though there is no sensing result of physical crash of the vehicle from the crash sensor 23, the controller 21 may transmit an accident message for notifying the terminal of the hazardous situation. For this, the controller 21 may include a function of sensing a hazardous situation before physical crash occurs if a road state (e.g., slipperiness, vibration, and/or the like) of a road, a landslide and a rockslide through a camera, and/or the like are identified.

Although the controller 21, the crash sensor 23, and the communication unit 25 are described as separate units in the electronic device in FIG. 2b, it is to be understood that the electronic device may be implemented with a form into which at least two of the controller 21, the crash sensor 23, and the communication unit 25 are incorporated.

The electronic device may be implemented with at least one processor. That is, the electronic device may be implemented with a form which includes at least one of modules as shown in FIG. 2b.

An inner structure of an electronic device mounted within a vehicle in a communication system according to an embodiment of the present disclosure has been described with reference to FIG. 2b, and another example of a method of sharing image information related to the first vehicle in a communication system according to an embodiment of the present disclosure will be described with reference to FIG. 3.

Figure 3:
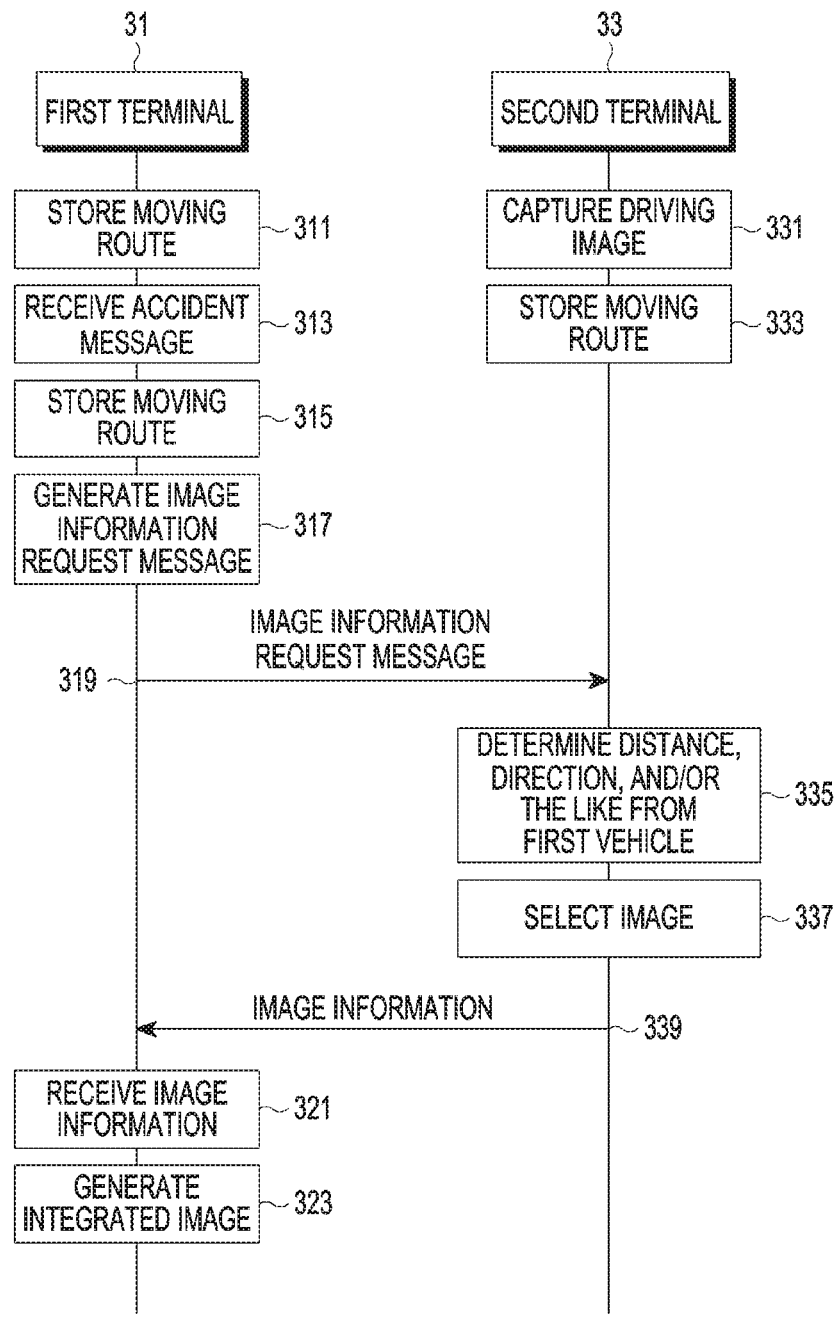
FIGS. 3, and 6 to 14b schematically illustrate examples of a method of sharing image information related to the first vehicle in a communication system according to various embodiments of the present disclosure.

FIG. 3 schematically illustrates another example of a method of sharing image information related to the first vehicle in a communication system according to an embodiment of the present disclosure.

In an example in FIG. 3, the first terminal 31 is a terminal of the first vehicle, and the second terminal 33 is a terminal of the second vehicle. It will be assumed that the first terminal 31 is capturing a driving image. The capturing of the driving image in the first terminal 31 may be selectively performed. Referring to FIG. 3, a moving route by time according to driving of the first terminal 31 is recorded and stored at operation 311. The moving route includes location information by time according to the driving. So, it will be understood that the moving route is location information by time of a corresponding terminal or vehicle. As described above, at least one information which may indicate a location of the terminal or a vehicle which communicates with the terminal such as a latitude, a longitude, an altitude, a speed, GPS information, a driving road, a coordinate value on a map, a driving lane, a driving heading, and/or the like of the vehicle may be used as the location information by time. According to an embodiment of the present disclosure which uses various information which may indicate a location of a vehicle as location information, for example, the location of the vehicle may be identified by separating lanes on the same road, and it may be identified that a vehicle is located at which road among two or more roads which exist at the same (or close) location on a two-dimensional coordinate. According to an embodiment of the present disclosure, unnecessary image information (for example, in a case that an accident occurs on a general road, image information which a vehicle driving on a high-level road, and/or the like where locations on a two-dimensional coordinate are close, but it is impossible to capture the accident captures, and/or the like) may be excluded based on exact location information, and only necessary image information may be transmitted and received.

The moving route may be recorded using a location measurement module mounted on the first terminal 31 (or the first vehicle). Meanwhile, the second terminal 33 captures a driving image at operation 331, and records and stores a moving route by time according to driving at operation 333. The capturing of the driving image may be performed using a camera of a terminal or a black box within a vehicle. In a case of using the black box within the vehicle, a vehicle application of the terminal communicates with the black box to classify and receive driving images on a time basis, or includes program codes for receiving image information which is stored with captured time from the black box.

Upon receiving the accident message from an electronic device of the first vehicle at operation 313, the first terminal 31 selects a moving route for predetermined time from the stored moving route at operation 315. The selected moving route corresponds to, for example, a moving route for the predetermined time before sensing an accident. The first terminal 31 transmits a message for requesting image information related to the selected moving route (hereinafter, "image information request message") through a wireless communication at operation 317. In a case of transmitting and receiving the image information for the moving route for the predetermined time before sensing the accident, the first terminal 31 and the second terminal 33 may transmit and receive only image information which corresponds to a corresponding moving route, so congestion of a wireless channel may be decreased, and time, cost, manpower, and/or the like consumed for analyzing an image due to transmission and reception of unnecessary image information. In this case, data amount of image information transmitted and received among terminals may be decreased, so communication cost may be decreased, and possibility that all of necessary image information may be not transmitted and received due to a limit to a data rate may be prevented. The wireless communication may use various communication schemes as described above. The image information request message may be transmitted with a broadcast message type such that at least one second vehicle may receive the image information request message. The image information request message may include at least one of time when the electronic device of the first vehicle senses an occurrence of an accident (for example, time when a crash sensor 23 of the first vehicle senses physical crash, and a sensed signal is transferred to a controller 21, and the controller 21 senses the accident)(hereinafter, "accident sensed time"), an accident point, the selected moving route, a moving route by time before the accident, and identification information of the first vehicle. The accident point may be obtained from a moving route by time which corresponds to the accident sensed time. The selected moving route and the moving route by time before the accident have been described as separate information, however, the moving route by time before the accident may be included in the selected moving route. The accident sensed time has been described as just an example, and the accident sensed time is not limited to the example as described above. For example, the accident sensed time may be set with various forms such as time which is corrected by considering time consumed until the first terminal 31 receives an accident message after crash from a crash sensor of a vehicle is sensed such that the accident sensed time becomes close to actual accident time, and/or the like. If the present disclosure is applied to expectation of a hazardous situation in a vehicle, the accident sensed time may be time when the expectation is performed if an electronic device of the vehicle or a terminal expects the hazardous situation, and/or the like. Various information which may identify a corresponding vehicle such as a vehicle number, a telephone number of a vehicle owner, a Medium Access Control (MAC) address allocated to an electronic device of the first vehicle, and/or the like may be used as the identification information of the first vehicle. It is possible that the identification information of the first terminal may be used as the identification information of the first vehicle.

Figure 15:
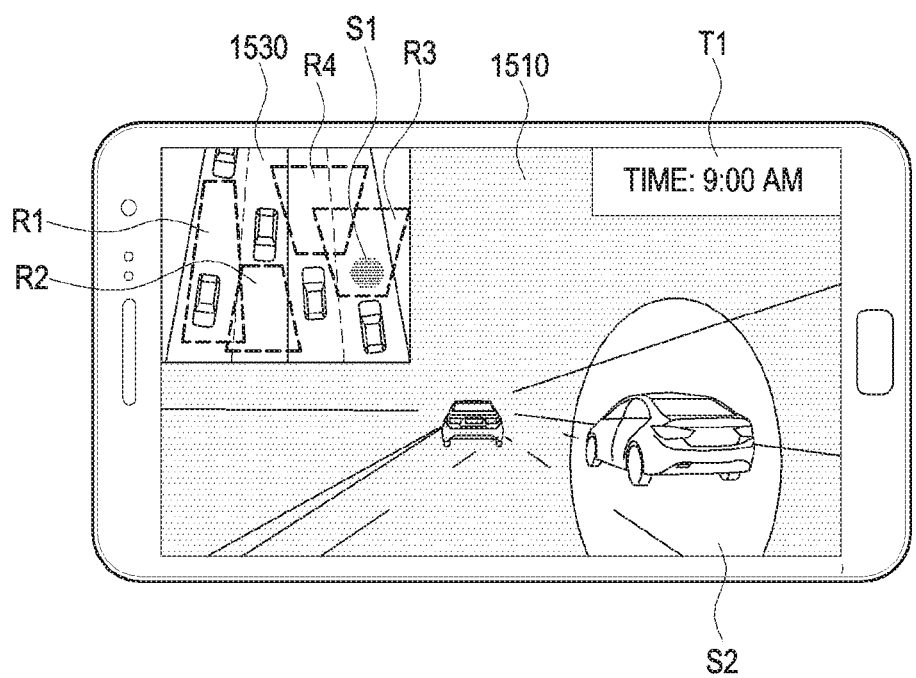
FIG. 15 schematically illustrates an integrated image according to an embodiment of the present disclosure.

After receiving the image information request message, the second terminal 33 determines at least one of a distance between the first vehicle and the second vehicle, a direction at which the first vehicle is located which is identified based on the second vehicle, and whether the first vehicle and the second vehicle exist on the same road based on information obtained from the image information request message (for example, at least one of accident sensed time, an accident point, a selected moving route, a moving route by time before an accident, and identification information of the first vehicle) at operation 335. The second terminal 33 transmits, to the first terminal 31, image information where the first vehicle is captured among a driving image of the second vehicle and which is selected according to the determined result at operations 337 and 339. After receiving the selected image information at operation 321, the first terminal 31 integrates a driving image of the first vehicle and the image information received from the second vehicle to generate an integrated image in which an accident situation of the first vehicle may be identified at various viewing angels at operation 323. The operation 323 may be omitted. When the integrated image is generated, a driving image which corresponds to the moving route selected at operation 315 may be used as the driving image of the first vehicle to be integrated. The integrated image may be generated based on time when an image is captured, a location at which the image is captured, and/or the like. Referring to an example in FIG. 15 for describing the integrated image, at least one area (R1, R2, R3, and R4) which is separated according to a viewing angle by captured location is displayed on one part of a screen 1510 where the integrated image is displayed, and a Picture Inside Picture (PIP) screen 1530 where a desired area may be selected from the at least one area (R1, R2, R3, and R4) which corresponds to the viewing angle by location may be provided with captured time (T1). If an area is selected (S1) from the PIP screen 1530 through a touch input, a mouse, a stylus pen, and/or the like, an image which is captured at a viewing angle of the selected region (S1) may be displayed like as a reference sign S2. In a case of using the integrated image, an accident situation, and/or the like may be identified at various viewing angles, so a reason for an occurrence of an accident, and/or the like may be clearly identified. A screen composition in FIG. 15 indicates an embodiment, and a screen which displays the integrated image may be modified and provided with various forms. For example, the screen for selecting the area which corresponds to the viewing angle by location may be provided as a separate screen instead of the PIP screen 1530. In a case of selecting a plurality of areas which correspond to the viewing angle by location, it is possible to output a plurality of screens for preparing a plurality of images according to the selection.

In an embodiment in FIG. 3, the first terminal 31 transmits the image information request message upon receiving the accident message from the first vehicle, however, in another embodiment in which a driving state of the first vehicle is abnormal or is a urgent state (i.e., the hazardous situation), it is possible to transmit the image information request message even though there is no reception of the accident message at operation 313. As described above, the determination of the hazardous situation may be performed in an electronic device which controls driving of the first vehicle, and it is possible that the first terminal 31 determines the hazardous situation based on information received from the electronic device of the first vehicle. For another example, it is possible to transmit the image information request message if there is a user's key input through an application of the first terminal 31 even though there is no reception of the accident message.

Another example of a method of sharing image information related to the first vehicle in a communication system according to an embodiment of the present disclosure has been described with reference to FIG. 3, and a method of selecting image information of the first vehicle in the second terminal of the second vehicle in a communication system according to an embodiment of the present disclosure will be described with reference to FIGS. 4, 5a, and 5b.

Figure 4:
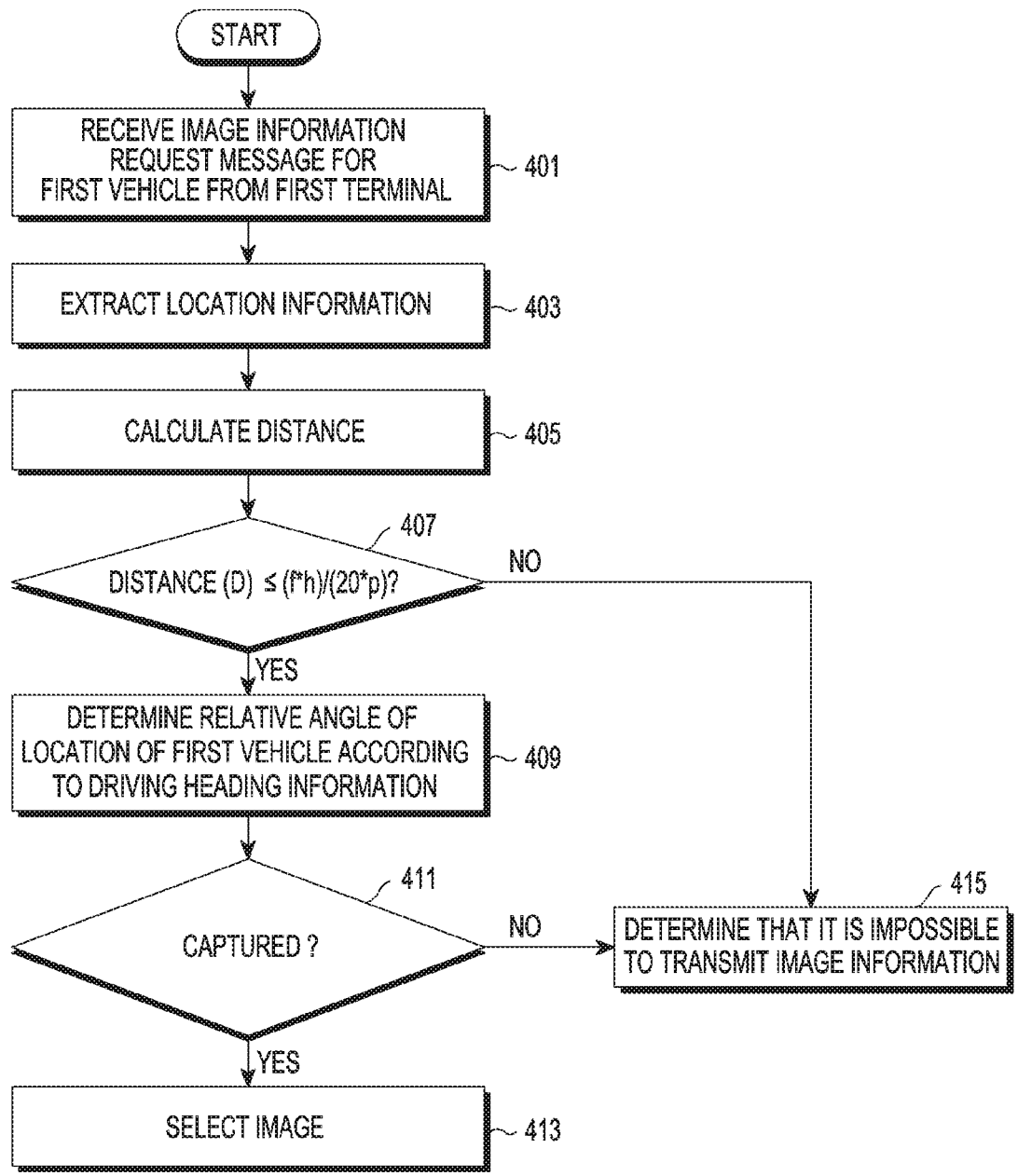
FIGS. 4, 5a, and 5b schematically illustrate a method of selecting image information of the first vehicle in the second terminal of the second vehicle in a communication system according to an embodiment of the present disclosure.
Figure 5A:
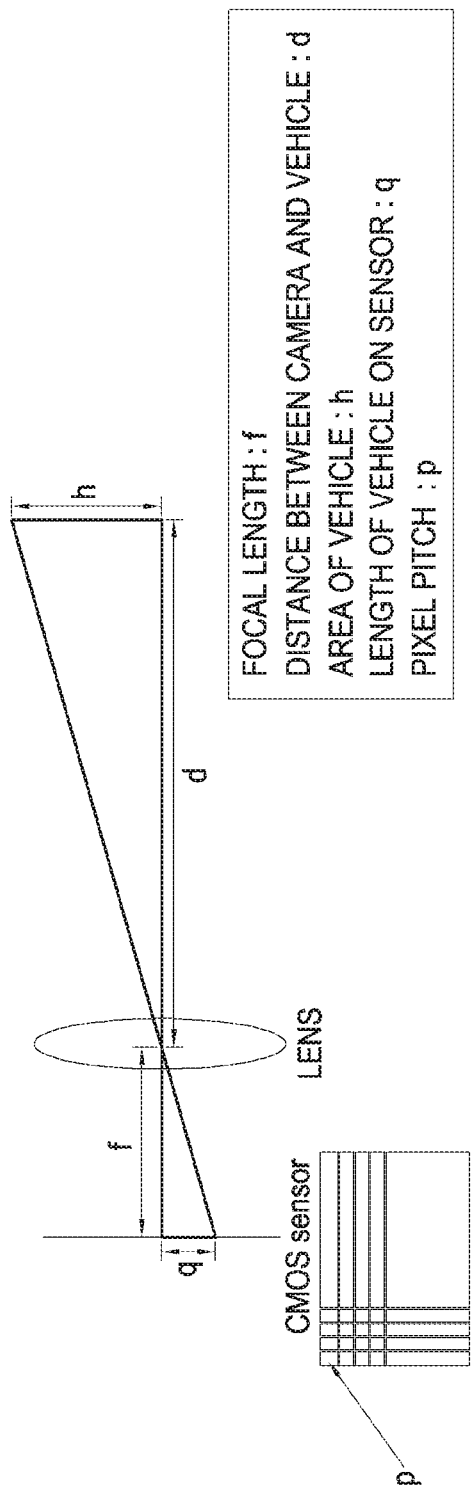
Figure 5B:
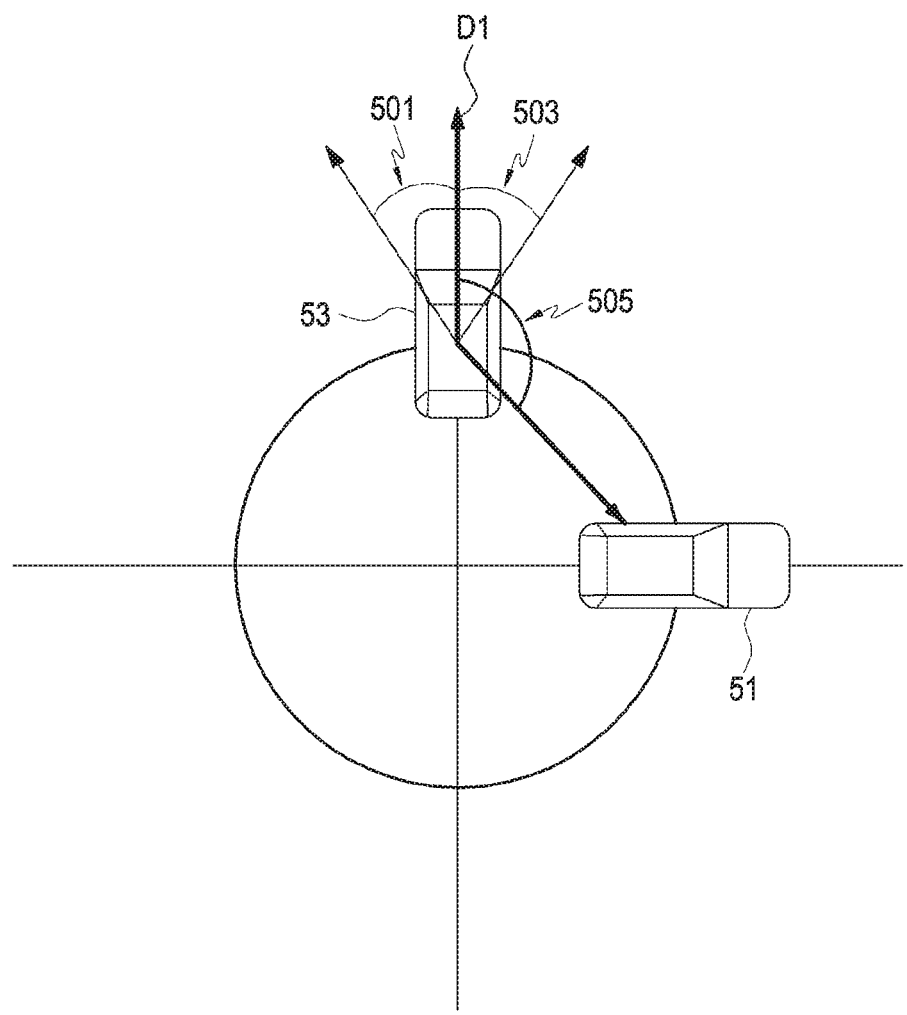

FIGS. 4, 5a, and 5b schematically illustrate a method of selecting image information of the first vehicle in the second terminal of the second vehicle in a communication system according to an embodiment of the present disclosure.

Referring to FIG. 4, it will be noted that a method of selecting image information of the first vehicle in the second terminal of the second vehicle in FIG. 4 indicates a method of selecting image information by determining a distance between the first vehicle and the second vehicle and a direction of the first vehicle in the second terminal of the second vehicle which receives an image information request message. More particularly, it will be noted that FIG. 4 concretely indicates an operation of operations 335 and 337 in FIG. 3.

Referring to FIG. 4, the second terminal 33 which receives the image information request message for the first vehicle from the first terminal 31 at operation 401 extracts location information of the first vehicle from the received image information request message at operation 403. The image information request message includes a moving route of the first vehicle, and the moving route includes location information of the first vehicle as described above. At least one information which may indicate a location of a vehicle such as a latitude, a longitude, an altitude, a speed, GPS information, a driving road, a coordinate value on a map, a driving lane, a driving heading, and/or the like of the first vehicle may be used as the location information. So, the second terminal 33 may extract the location information of the first vehicle from the image information request message received from the first terminal 31.

The second terminal 33 calculates a distance by time (d) between the first vehicle and the second vehicle using the location information of the first vehicle and location information of the second vehicle at operation 405. For example, the distance (d) between the first vehicle and the second vehicle may be calculated using GPS information of the first vehicle and GPS information of the second vehicle. The second terminal 33 determines whether the calculated distance (d) satisfies a criterion in <Equation 1> at operation 407.

$$\text{distance}(d) \leq (f*h)/(20*p) \qquad \text{<Equation 1>}$$

Definition and meaning of variables (f, d, h, q, and p) in <Equation 1> may be the same as shown in FIG. 5a. There is a relation $q=f*h/d$, and the number of pixels of a captured image$=q/p=(f*h/d)/p$, so <Equation 1> indicates an example of determining whether a criterion $20 \leq (f*h/d)/p$ (that is, the number of pixels is equal to or greater than 20) is satisfied. The 20 pixels are just an embodiment, and the number of pixels which satisfies the criterion may be set to a different value according to required resolution of image information related to the first vehicle.

In a distance (d) in FIG. 5a, a camera is a camera of the second vehicle. If the calculated distance (d) satisfies the criterion in <Equation 1> at operation 407, this means that an image captured through the second terminal 33 may be sufficiently identified if the image captured through the second terminal 33 is used as image information related to the first vehicle.

The second terminal 33 calculates a relative angle of a location of the first vehicle to the second vehicle based on driving heading information of the first vehicle included in a moving route of the first vehicle at operation 409. Referring to FIG. 5b, a relative angle 505 of the first vehicle 51 may be calculated based on the driving heading information of the first vehicle based on a driving heading (D1) of the second vehicle 53. The second terminal 33 may determine whether the camera of the second terminal 33 captures the first vehicle based on the relative angle 505 at operation 411. If the relative angle 505 is within an available capturing angle of a camera, the second terminal 33 may determine that the first vehicle is captured. In FIG. 5b, reference signs 501 and 503 indicate an example of a range of an available capturing angle in the camera of the second terminal 33, and indicate a case that the camera of the second terminal 33 has captured angle ranges 305 to 360 degrees (501) and 0 to 55 degrees (503) upon capturing the front based on the driving heading (D1). That is, if the relative angle 505 is within the available capturing angle 501 or 503, the second terminal 33 may determine that the first vehicle is captured. At this time, if the first vehicle is captured, the second terminal 33 may determine that the first vehicle is captured in a camera of which direction (the front, the left/right side, the rear, and/or the like). <Table 1> indicates an example of determining whether the first vehicle is captured based on the relative angle 505 in the second terminal 33.

TABLE 1

| TIME | 11:00:02 | 11:00:04 | 11:00:06 | 11:00:08 | ... |
|---|---|---|---|---|---|
| I_GPS | 37.292402, 127.031191 | 37.292409, 127.031248 | 37.292428, 127.031439 | 37.292462, 127.032165 | |
| I_Heading | (N-basis) 15° | (N-basis) 15° | (N-basis) 15° | (N-basis) 20° | |
| cameraCoverage | 0~55° 305~360° | 0~55° 305~360° | 0~55° 305~360° | 00~55° 305~360° | |
| Message_GPS | 37.292406, 127.031221 | 37.292405, 127.031210 | 37.292412, 127.031272 | 37.292426, 127.031415 | |
| Distance difference | 3 m | 4 m | 15 m | 50 m | |
| Message_location_relative angle | 30° | 110° | 150° | 160° | |
| Whether to be captured | ○ | X | X | X | |

In <Table 1>, "I_Heading" denotes driving heading information of the first vehicle, "I_GPS" denotes GPS information of the second vehicle, "Message_GPS" denotes GPS information of the first vehicle, a fixed value is used as Camera_coverage according to a camera specification, "distance difference" denotes the calculated distance (d) between the first vehicle and the second vehicle, and "Message_location_relative angle" denotes the relative angle at which the first vehicle is located based on the driving heading of the second vehicle.

Upon determining that the first vehicle is captured at operation 411, the second terminal 33 selects image information related to the first vehicle based on a moving route by time of the first vehicle obtained from the image information request message from a driving image of the second vehicle at operation 413. If the criterion of <Equation 1> is unsatisfied at operation 407 or it is determined that the first vehicle is not captured at operation 411, the second terminal 33 determines that it is impossible to transmit the image information related to the first vehicle, and may transmit a message for notifying the first terminal 31 of the state that the transmission is impossible or may terminate the procedure without transmitting a separate message and performing the next operation for transmitting image information at operation 415.

Meanwhile, at least one of operations 405 to 411, and 415 in FIG. 4 may be omitted.

For example, only an image which is captured for a time interval during which a calculated distance is within a predetermined distance may be selected by omitting operations 407, 409, 411, and 415 and performing only operation 405. For another example, only an image which is captured for a time interval during which the distance calculated at operation 405 satisfies the criterion of <Equation 1> at operation 407 may be selected by omitting operations 409 and 411. For still another example, operations 405 and 407 may be omitted. For still another example, only an image which is captured for a time interval during which operation 407 is omitted, the distance calculated at operation 405 is within a predetermined distance, and it is determined that capturing is performed according to operations 409, 411, and 415 may be selected.

For still another example, all of operations 405 to 411, and 415 may be omitted. In this case, an image which is captured based on the location information extracted at operation 403 may be selected. The extracted location information is location information by time, so an image which is captured within a determined range may be selected based on the extracted location information if a moving route of the first vehicle and a moving route of the second vehicle are close within the determined range for a predetermined time interval.

Although FIG. 4 illustrates a method of selecting image information of the first vehicle in the second terminal of the second vehicle in a communication system according to an embodiment of the present disclosure, various changes could be made to FIG. 4. For example, although shown as a series of operations, various operations in FIG. 4 could overlap, occur in parallel, occur in a different order, or occur multiple times.

A method of selecting image information of the first vehicle in the second terminal of the second vehicle in a communication system according to an embodiment of the present disclosure has been described with reference to FIGS. 4, 5a, and 5b, and still another example of a method of sharing image information related to the first vehicle in a communication system according to an embodiment of the present disclosure will be described with reference to FIG. 6.

Figure 6:
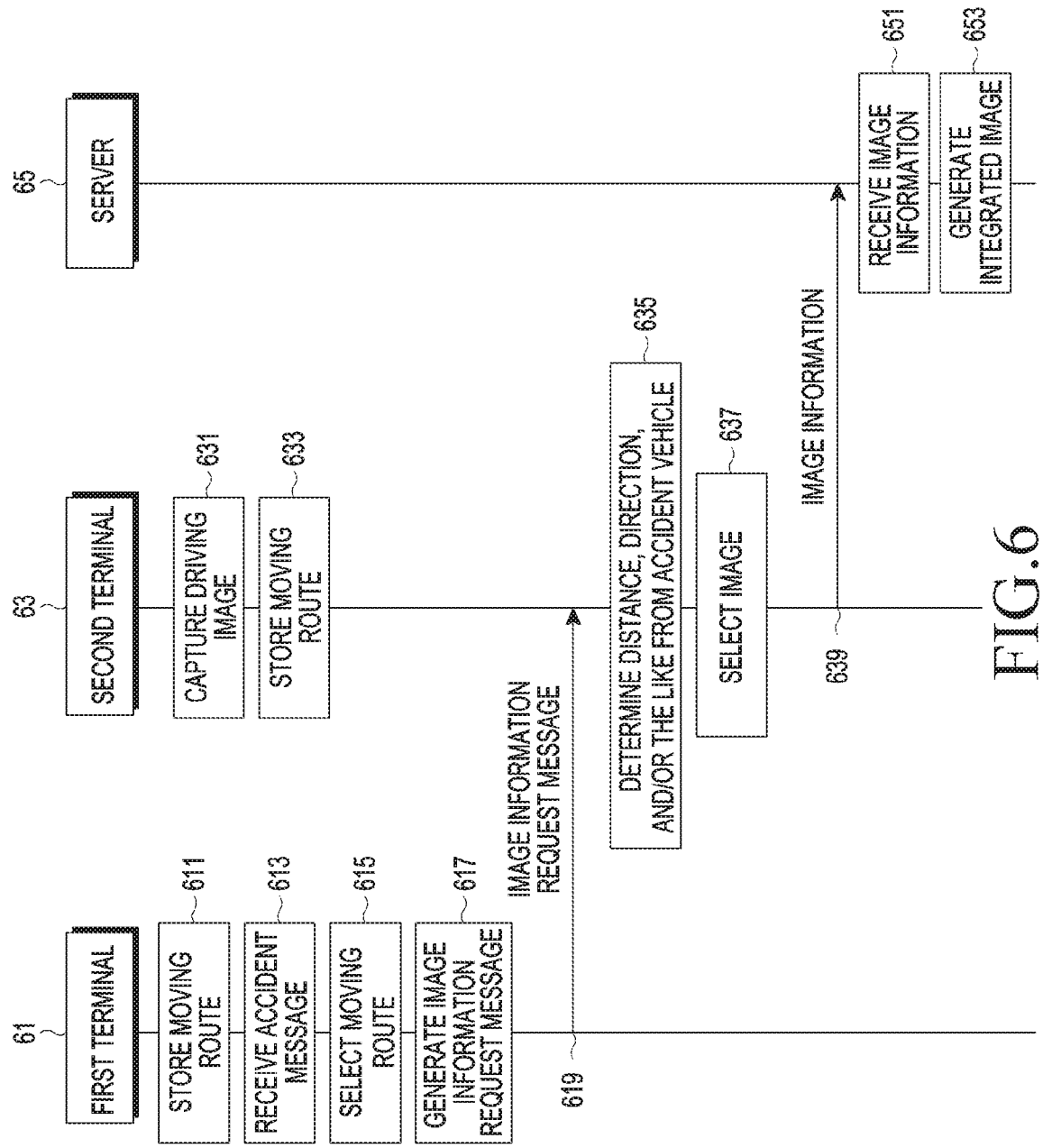

FIG. 6 schematically illustrates still another example of a method of sharing image information related to the first vehicle in a communication system according to an embodiment of the present disclosure.

Referring to FIG. 6, the first terminal 61 is a terminal of the first vehicle, the second terminal 63 is a terminal of the second vehicle, and a server 65 is a cloud server for receiving image information related to the first vehicle from the second terminal 63.

An operation of operations 611 to 619, and 631 to 637 in a method of sharing image information related to the first vehicle as shown in FIG. 6 is identical to an operation of operations 311 to 319, and 331 to 337 in a method of sharing image information related to the first vehicle as shown in FIG. 3, so a detailed description thereof will be omitted herein.

A method of sharing image information related to the first vehicle as shown in FIG. 6 may be related to a method of sharing image information related to the first vehicle as shown in FIG. 3. For example, in a method of sharing image information related to the first vehicle as shown in FIG. 3, in a case that the second terminal may not completely transmit image information to the first terminal since the second terminal is driving or a communication environment is unsuitable for transmitting the image information, the second terminal 63 may transmit, to a server 65 which is designated for managing image information in advance, image information related to the first vehicle at operation 639 as like in a method of sharing image information related to the first vehicle as shown in FIG. 6.

Selectively, it is possible to transmit image information to both the first terminal 61 and the server 65. At this time, it is possible to transmit, to the first terminal 61, image information of low or medium resolution for fast transmission, and to transmit, to the server 65, image information of high resolution for checking more accurate reason for an accident.

Selectively, the second terminal 63 may directly transmit, to the server 65, the image information related to the first vehicle regardless of successfully transmitting the image information to the first terminal 61.

Selectively, it is possible for the second terminal 63 to transmit the image information related to the first vehicle by considering a communication environment of the second terminal 63. For example, if the second terminal 63 is not located at a Wi-Fi zone upon receiving an image information request message, it is possible for the second terminal 63 to temporally wait for transmission of image information, move into the Wi-Fi zone, and transmit the image information.

At operation 651, the server 65 receives the image information related to the first vehicle from the second terminal 63, and may generate an integrated image where at least one image information received from the first terminal 61 or other neighbor vehicle and the image information received at operation 639 are integrated although not shown. Operation 653 may be omitted. Like in an embodiment in FIG. 6, in a case of transmitting image information to the server 65, information required for transmitting the image information such as authentication information for accessing the server 65, address information of the server 65, and/or the like may be preset on the vehicle application installed at each terminal 61 and 63. For a selective embodiment, the image information request message which the first terminal 61 transmits at operation 617 may include the address information of the server 65, and/or the like as additional information.

Still another example of a method of sharing image information related to the first vehicle in a communication system according to an embodiment of the present disclosure has been described with reference to FIG. 6, and still another example of a method of sharing image information related to the first vehicle in a communication system according to an embodiment of the present disclosure will be described with reference to FIG. 7.

Figure 7:
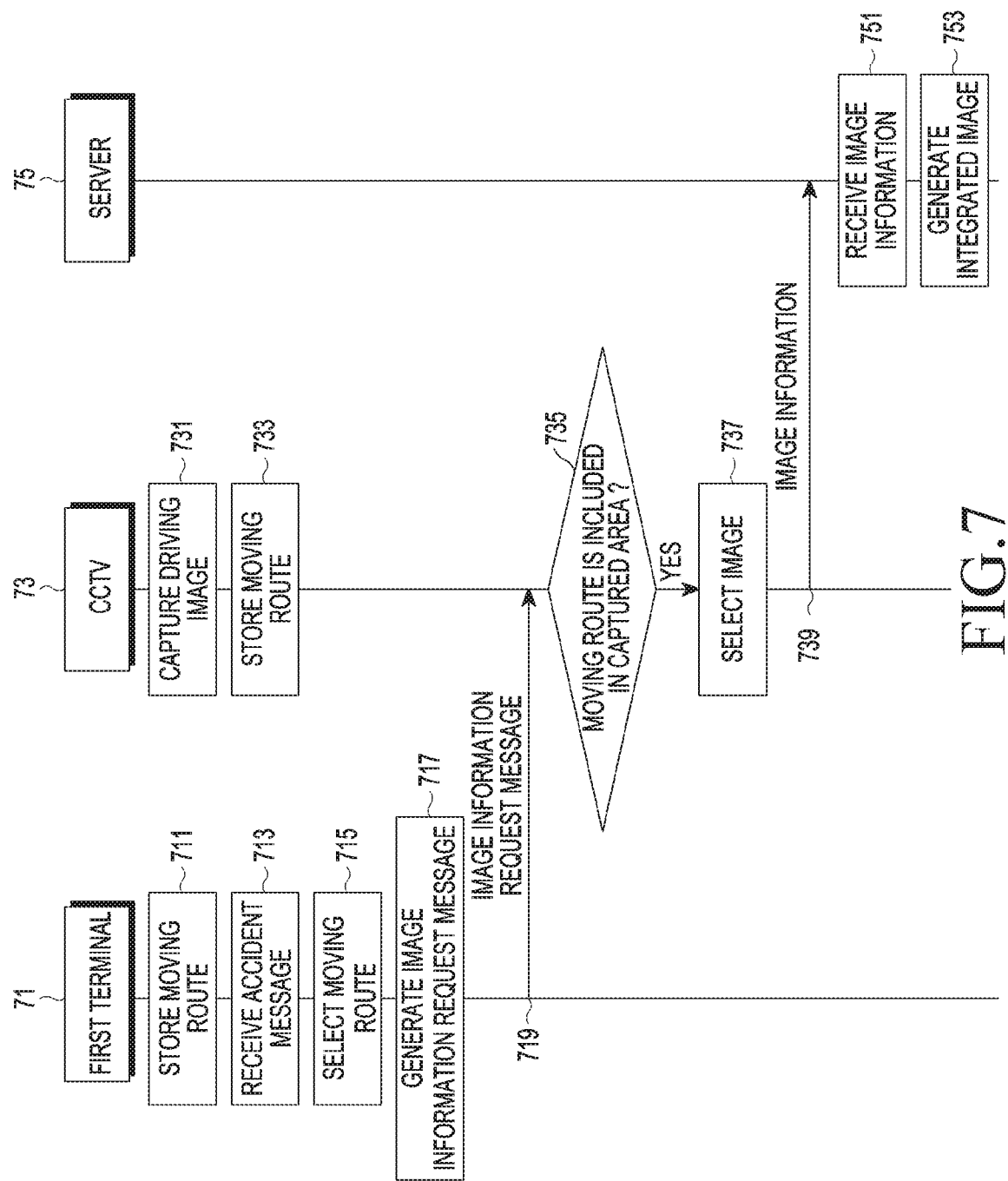

FIG. 7 schematically illustrates still another example of a method of sharing image information related to the first vehicle in a communication system according to an embodiment of the present disclosure.

Referring to FIG. 7, the first terminal 71 is a terminal of the first vehicle, and a CCTV 73 is a closed circuit TV which is installed on a road, and includes a camera which may capture a driving image of vehicles at the installed area and a communication unit which may use a wireless communication as described above. The CCTV may include a controller for controlling transmission and reception of image information with the terminal or an outer server, and a storage unit which may store the driving image and/or the image information. A server 75 may be implemented with a cloud server for receiving image information related to the first vehicle from the CCTV 73 as described above.

An operation of operations 711 to 717 in a method of sharing image information related to the first vehicle as shown in FIG. 7 is identical to an operation of operations 311 to 317 in a method of sharing image information related to the first vehicle as shown in FIG. 3, so a detailed description thereof will be omitted herein. A method of sharing image information related to the first vehicle as shown in FIG. 7 indicates a case that the CCTV 73, not the second terminal of the second vehicle like in a method of sharing image information related to the first vehicle as shown in FIG. 3, receives the image information request message transmitted at operation 719.

Referring to an operation of the CCTV 73, the CCTV 73 captures driving images of neighbor vehicles at an installed area, and classifies and stores moving routes by time of the neighbor vehicles at operation 731 and 733. Upon receiving the image information request message at operation 719, the CCTV 73 determines whether a moving route of the first terminal 71 is included in the captured area of the CCTV 73 at operation 735. If the moving route of the first terminal 71 is included in the captured area, the CCTV 73 selects image information which corresponds to the moving route of the first terminal 71 from the stored driving images of the neighbor vehicles at operation 737, and transmits the selected image information to the server 75 at operation 739. For this, the image information request message at operation 719 may include address information of the server 75, and/or the like. For another embodiment, information required for transmitting image information such as authentication information for accessing the server 75, the address information of the server 75, and/or the like may be preset in the CCTV 73. An operation of receiving image information to generate an integrated image in the server 75 at operations 751 and 753 is identical to an operation of operations 651 and 653 in a method of sharing image information related to the first vehicle as shown in FIG. 6, so a detailed description thereof will be omitted herein.

Still another example of a method of sharing image information related to the first vehicle in a communication system according to an embodiment of the present disclosure has been described with reference to FIG. 7, and still another example of a method of sharing image information related to the first vehicle in a communication system according to an embodiment of the present disclosure will be described with reference to FIG. 8.

Figure 8:
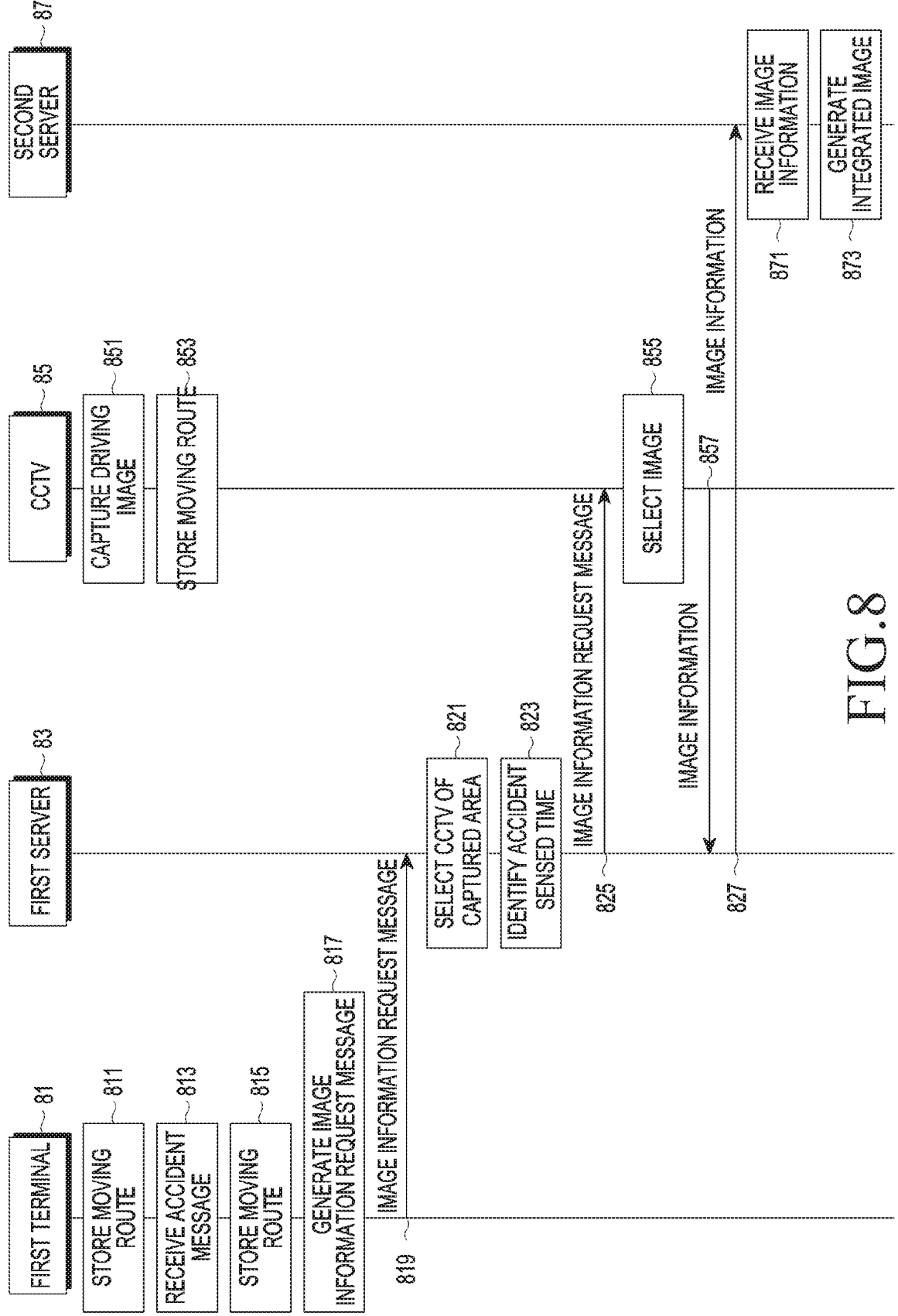

FIG. 8 schematically illustrates still another example of a method of sharing image information related to the first vehicle in a communication system according to an embodiment of the present disclosure.

Referring to FIG. 8, the first terminal 81 is a terminal of the first vehicle, the first server 83 is a server of a traffic control surveillance center, a CCTV 85 is a closed circuit TV which is installed on a road and may capture driving images of neighbor vehicles at an installed area, and a CCTV 85 in FIG. 8 is configured to transmit image information like a CCTV 73 in FIG. 7. In a method of sharing image information related to the first vehicle as shown in FIG. 8, the CCTV 85 receives an image information request message from the first server 83 of the traffic control surveillance center, not the first terminal 81. The second server 87 is a cloud server for receiving image information related to the first vehicle from the first server 83.

In a method of sharing image information related to the first vehicle as shown in FIG. 8, an operation of operations 811 to 817 is identical to an operation of operations 311 to 317 in a method of sharing image information related to the first vehicle as shown in FIG. 3, and an operation of operations 851 and 853 is identical to an operation of operations 731 and 733 in a method of sharing image information related to the first vehicle as shown in FIG. 7, so a detailed description thereof will be omitted herein. A method of sharing image information related to the first vehicle as shown in FIG. 8 indicates a case that the first server 83, not the second terminal of the second vehicle like in a method of sharing image information related to the first vehicle as shown in FIG. 3, receives the image information request message transmitted at operation 819.

Upon receiving the image information request message, the first server 83 selects a CCTV 85 of a corresponding captured area based on a moving route of the first vehicle at operation 821 in FIG. 8, and identifies accident sensed time included in the image information request message at operation 823. The first server 83 transmits the image information request message to the selected CCTV 85 at operation 825, and image information related to the first vehicle selected from the CCTV 85 is transferred to the second server 87 as a cloud server through the first server 83 of the traffic control surveillance center at operations 855, 857, and 827. An operation of receiving image information to generate an integrated image at operations 871 and 873 in the second server 87 is identical to an operation of operations 651 and 653 in a method of sharing image information related to the first vehicle as shown in FIG. 6, so a detailed description thereof will be omitted herein.

Still another example of a method of sharing image information related to the first vehicle in a communication system according to an embodiment of the present disclosure has been described with reference to FIG. 8, and still another example of a method of sharing image information related to the first vehicle in a communication system according to an embodiment of the present disclosure will be described with reference to FIG. 9.

Figure 9:
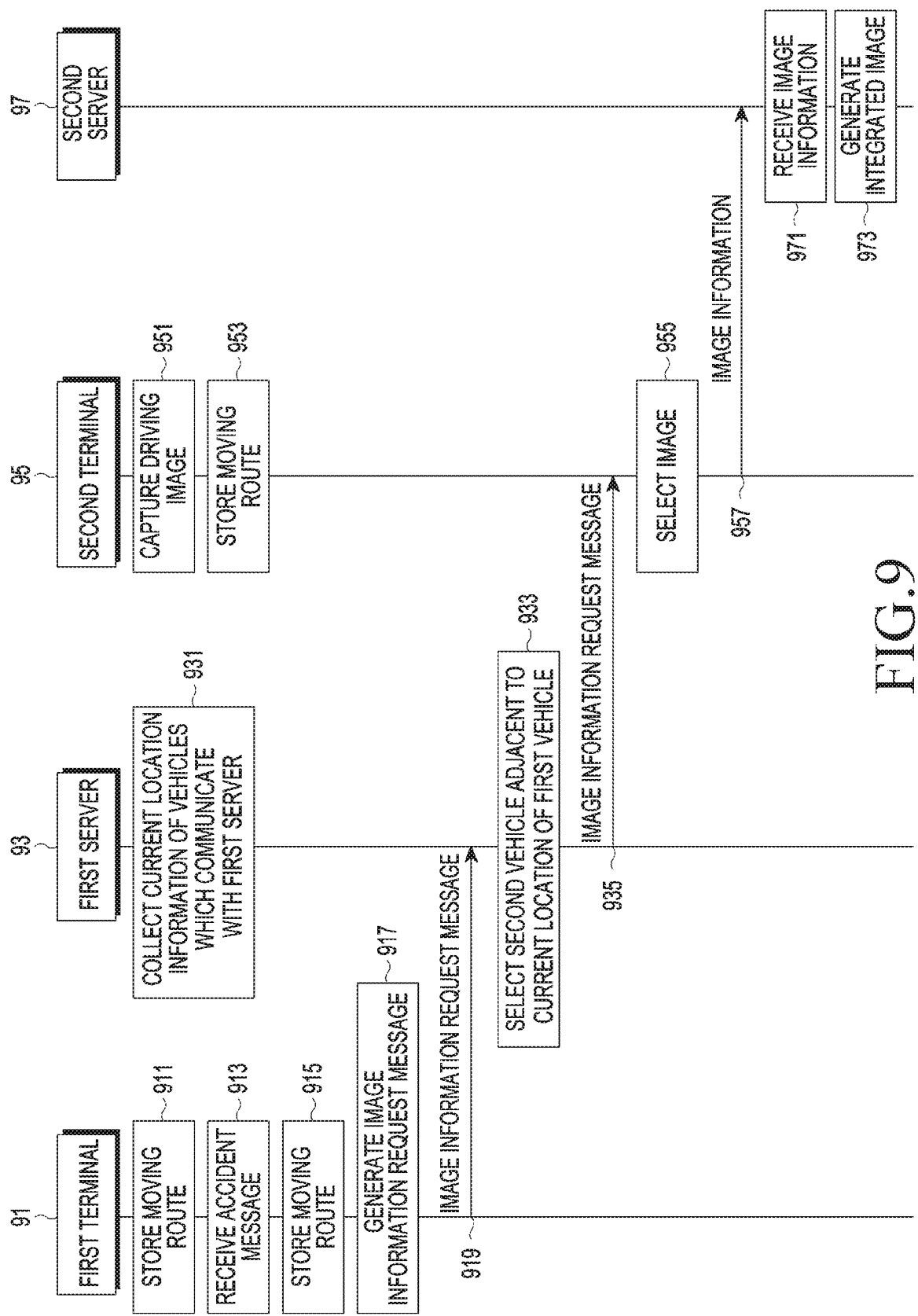

FIG. 9 schematically illustrates still another example of a method of sharing image information related to the first vehicle in a communication system according to an embodiment of the present disclosure.

Referring to FIG. 9, the first terminal 91 is a terminal of the first vehicle, the first server 93 is a server of a traffic control surveillance center, the second terminal 95 is a terminal of the second vehicle, and the second server 97 is a cloud server for receiving image information related to the first vehicle. In a method of sharing image information related to the first vehicle as shown in FIG. 9, the first server 93 of the traffic control surveillance center may collect current location information of vehicles which communicate with the first server 93.

In a method of sharing image information related to the first vehicle as shown in FIG. 9, an operation of operations 911 to 917 is identical to an operation of operations 311 to 317 in a method of sharing image information related to the first vehicle as shown in FIG. 3, so a detailed description thereof will be omitted herein. In a method of sharing image information related to the first vehicle as shown in FIG. 9, the first server 93, not the second terminal of the second vehicle like in a method of sharing image information related to the first vehicle as shown in FIG. 3, receives the image information request message transmitted at operation 919. Upon receiving the image information request message, the first server 93 selects, at operation 933, the second vehicle adjacent to a current location of the first vehicle based on current location information of vehicles collected at operation 931. The first server 93 transmits the image information request message to the selected second terminal 95 of the second vehicle at operation 935. Upon receiving the image information request message, the second terminal 95 selects and transmits image information related to the first vehicle to the second server 97 at operations 955 and 957. An operation of remaining operations which are not described in a method of sharing image information related to the first vehicle as shown in FIG. 9 is identical to an operation in other examples of a method of sharing image information related to the first vehicle as described above, so a detailed description thereof will be omitted herein.

Still another example of a method of sharing image information related to the first vehicle in a communication system according to an embodiment of the present disclosure has been described with reference to FIG. 9, and still another example of a method of sharing image information related to the first vehicle in a communication system according to an embodiment of the present disclosure will be described with reference to FIG. 10.

Figure 10:
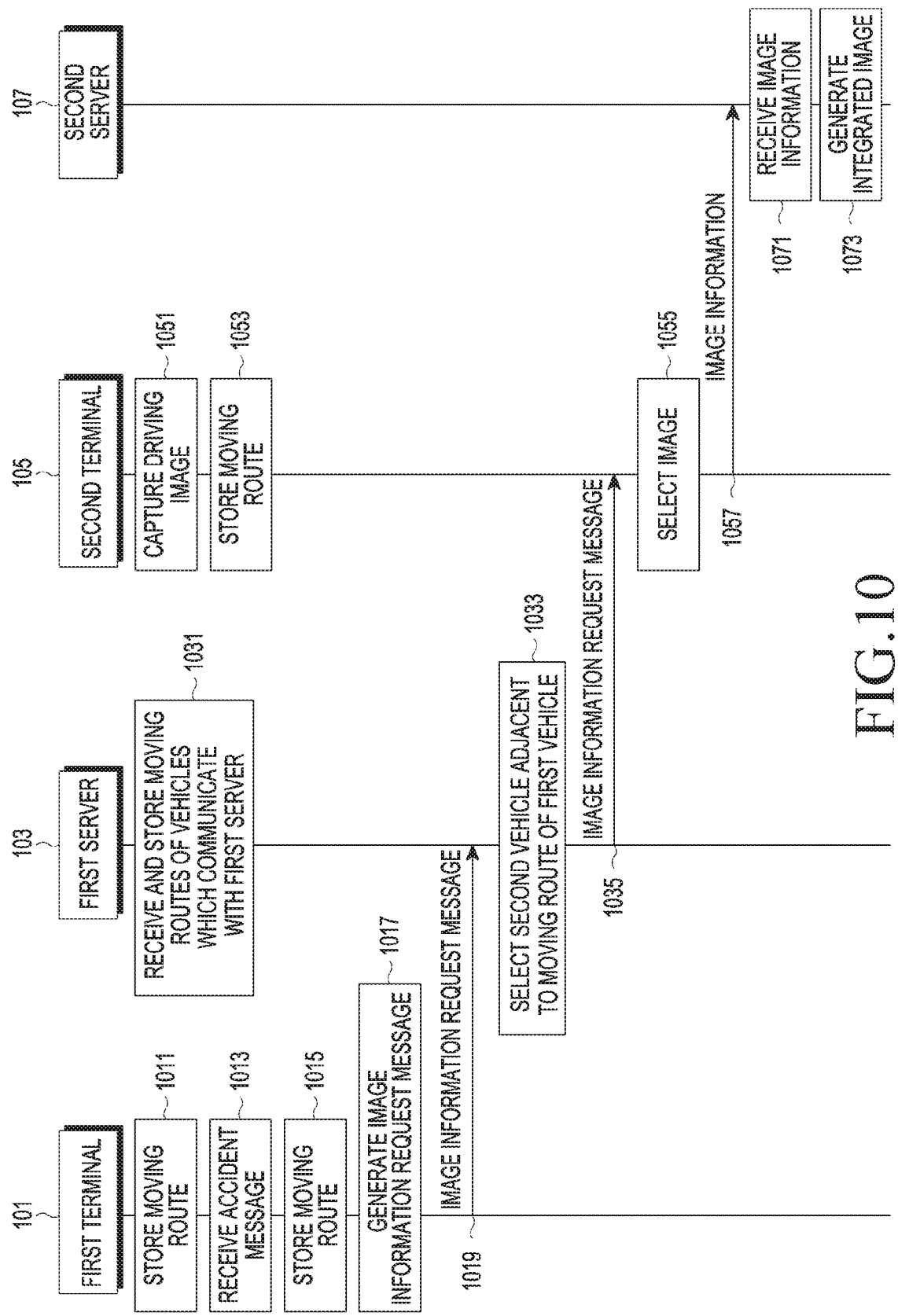

FIG. 10 schematically illustrates still another example of a method of sharing image information related to the first vehicle in a communication system according to an embodiment of the present disclosure.

Referring to FIG. 10, the first terminal 101 is a terminal of the first vehicle, the first server 103 is a server of a traffic control surveillance center, the second terminal 105 is a terminal of the second vehicle, and the second server 107 is a cloud server for receiving image information related to the first vehicle as described above. In FIG. 10, the first server 103 of the traffic control surveillance center may collect all moving routes of vehicles which communicate with the first server 103. That is, the first server 103 may receive and store a moving route of a corresponding vehicle from each of the first vehicle 101 and the second vehicle 105 which communicate with the first server 103.

In a method of sharing image information related to the first vehicle as shown in FIG. 10, an operation of operations 1011 to 1017 is identical to an operation of operations 311 to 317 in a method of sharing image information related to the first vehicle as shown in FIG. 3, so a detailed description thereof will be omitted herein. In FIG. 10, the first server 103 receives and stores all moving routes of vehicles which communicate with the first server 103 at operation 1031, so there is no need for the first terminal 101 of the first vehicle to transmit an image information request message including a moving route of the first terminal 101 of the first vehicle like embodiments as described above. So, the image information request message which does not include the moving route of the first vehicle may be transmitted from the first terminal 101 to the first server 103 at operation 1019. Upon receiving the image information request message, the first server 103 selects the second vehicle adjacent to the moving route of the first vehicle at operation 1033. The first server 103 transmits the image information request message to the second terminal 105 of the selected second vehicle at operation 1035. Upon receiving the image information request message, the second terminal 105 selects and transmits image information related to the first vehicle to the second server 107 at operations 1055 and 1057. An operation of remaining operations which are not described in a method of sharing image information related to the first vehicle as shown in FIG. 10 is identical to an operation in other examples of a method of sharing image information related to the first vehicle as described above, so a detailed description thereof will be omitted herein.

Still another example of a method of sharing image information related to the first vehicle in a communication system according to an embodiment of the present disclosure has been described with reference to FIG. 10, and still another example of a method of sharing image information related to the first vehicle in a communication system according to an embodiment of the present disclosure will be described with reference to FIG. 11.

Figure 11:
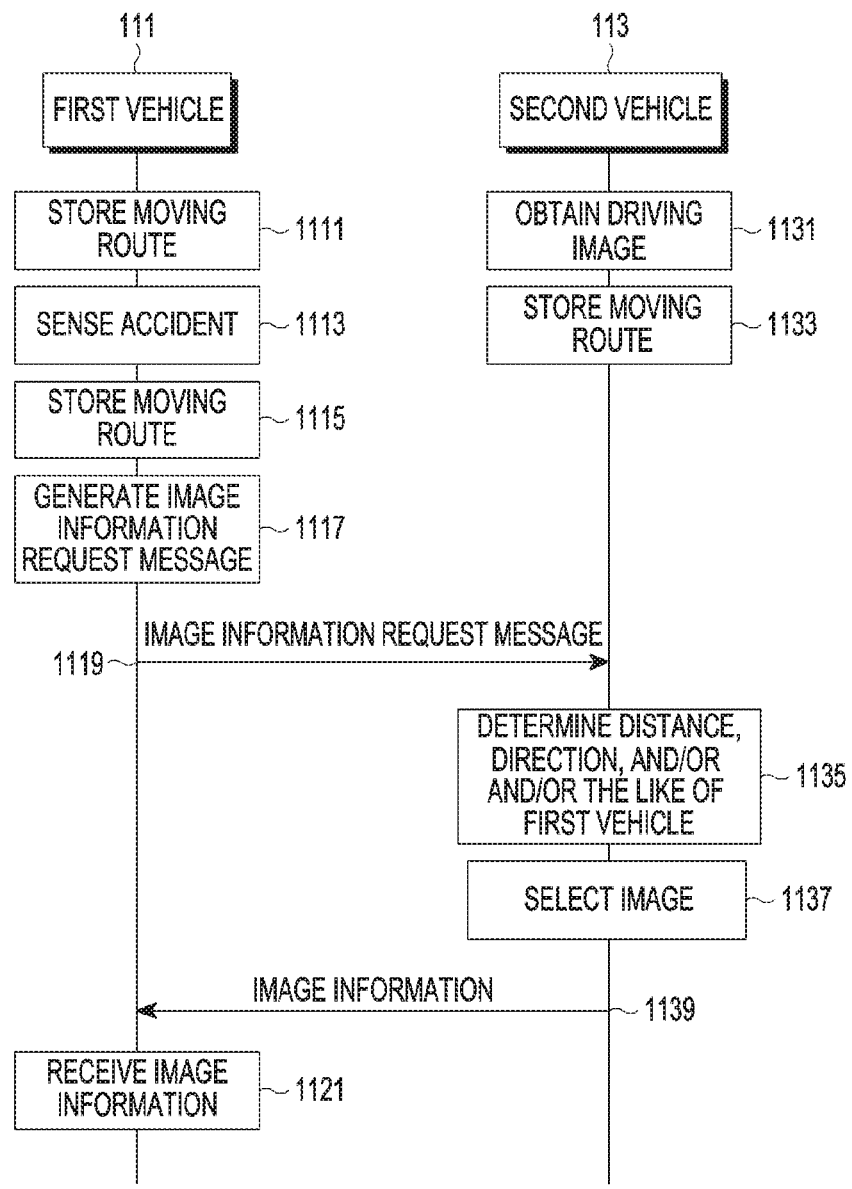

FIG. 11 schematically illustrates still another example of a method of sharing image information related to the first vehicle in a communication system according to an embodiment of the present disclosure.

In an example in FIG. 11, each of the first vehicle 111 and the second vehicle 113 includes an electronic device within a vehicle which equally performs a function of the first terminal 31 and the second terminal 33. So, in a method of sharing image information related to the first vehicle as shown in FIG. 11, an operation of operations 1111 to 1121 and an operation of operations 1131 to 1137 are identical to an operation of operations 311 to 321 and an operation of operations 331 to 337 in a method of sharing image information related to the first vehicle as shown in FIG. 3 except that an electronic device within a vehicle performs an operation performed in a terminal, so a detailed description thereof will be omitted herein. Further, at operation 1113 in FIG. 11, an electronic device of the first vehicle directly senses an occurrence of an accident, so there is no need for an operation of transmitting and receiving an accident message as described at operation 313 in FIG. 313.

Still another example of a method of sharing image information related to the first vehicle in a communication system according to an embodiment of the present disclosure has been described with reference to FIG. 11, and still another example of a method of sharing image information related to the first vehicle in a communication system according to an embodiment of the present disclosure will be described with reference to FIG. 12.

Figure 12:
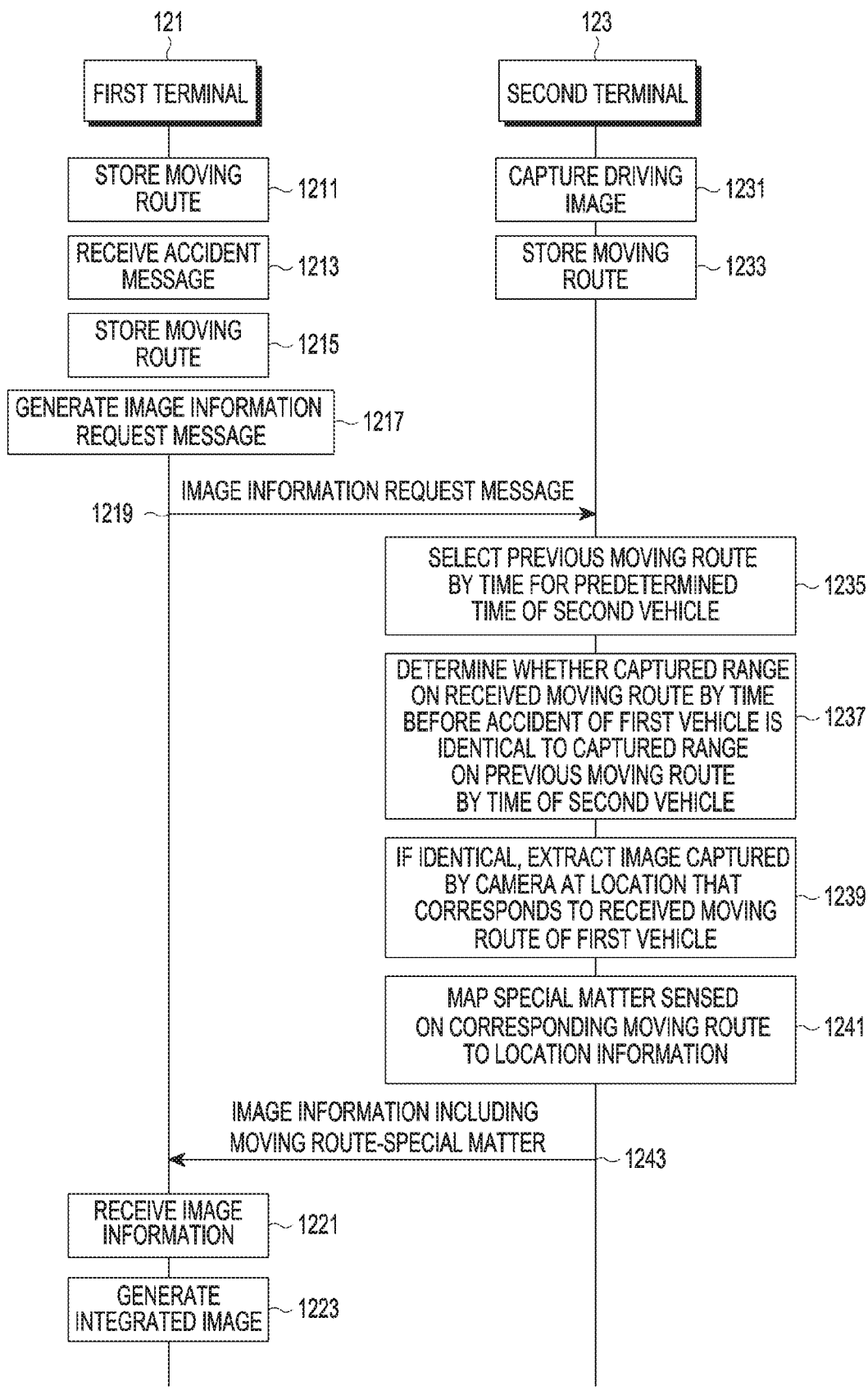

FIG. 12 schematically illustrates still another example of a method of sharing image information related to the first vehicle in a communication system according to an embodiment of the present disclosure.

In an example in FIG. 12, the first terminal 121 is a terminal of the first vehicle, and the second terminal 123 is a terminal of the second vehicle. An operation of operations 1211 to 1223 and an operation of operations 1231 and 1233 in a method of sharing image information related to the first vehicle as shown in FIG. 12 are basically identical to an operation of operations 311 to 323 and an operation of operations 331 and 333 in a method of sharing image information related to the first vehicle as shown in FIG. 3, so a detailed description thereof will be omitted herein. In a method of sharing image information related to the first vehicle as shown in FIG. 12, a moving route which the first terminal 121 generates at operation 1215, i.e., location information by time of the first vehicle may further include lane information by time of the first vehicle. The moving route includes a moving route of the first vehicle for predetermined time before an accident.

The second terminal 123 selects, at operation 1235, a moving route by time of the second terminal 123 which corresponds to the moving route by time of the first terminal 121 received at operation 1219. The moving route of the second terminal 123 selected at operation 1235 includes a previous moving route by time of the second terminal 123 for predetermined time. The second terminal 123 determines, at operation 1239, whether a captured range on a moving route by time before an accident of the first vehicle is identical to a captured range on the previous moving route by time of the second terminal 123 selected at operation 1235. If the captured ranges are the same, the second terminal 123 extracts, at operation 1239, a captured image which corresponds to the received moving route of the first vehicle from the driving image captured at operation 1231. Here, an operation of operations 1235 to 1239 corresponds to an operation of operations 335 and 337. So, it may be replaced with an operation of operations 1235 to 1239. Upon sensing a special matter (hereinafter, "moving route-special matter") such as a state of a road surface (e.g., a rockslide, slipperiness of a road surface, and/or the like), etc. from the extracted image information (or from the electronic device of the second vehicle) corresponding to the previous moving route by time of the second vehicle selected at operation 1235, the second terminal 123 maps the moving route-special matter to corresponding location information at operation 1241, and transmits image information including the moving route-special matter to the first terminal 121 at operation 1243. For a selective embodiment, the moving route-special matter may include a special matter by lane. An operation of remaining operations which are not described in a method of sharing image information related to the first vehicle as shown in FIG. 12 is identical to an operation which corresponds to an operation in other examples of a method of sharing image information related to the first vehicle as described above, so a detailed description thereof will be omitted herein.

The second terminal 123 may transmit, to the first terminal 121, at least one of a vehicle number, a vehicle color, and a vehicle size of the first vehicle as well as the moving route-special matter along with the image information.

Still another example of a method of sharing image information related to the first vehicle in a communication system according to an embodiment of the present disclosure has been described with reference to FIG. 12, and still another example of a method of sharing image information related to the first vehicle in a communication system according to an embodiment of the present disclosure will be described with reference to FIGS. 13a to 13c.

Figure 13A:
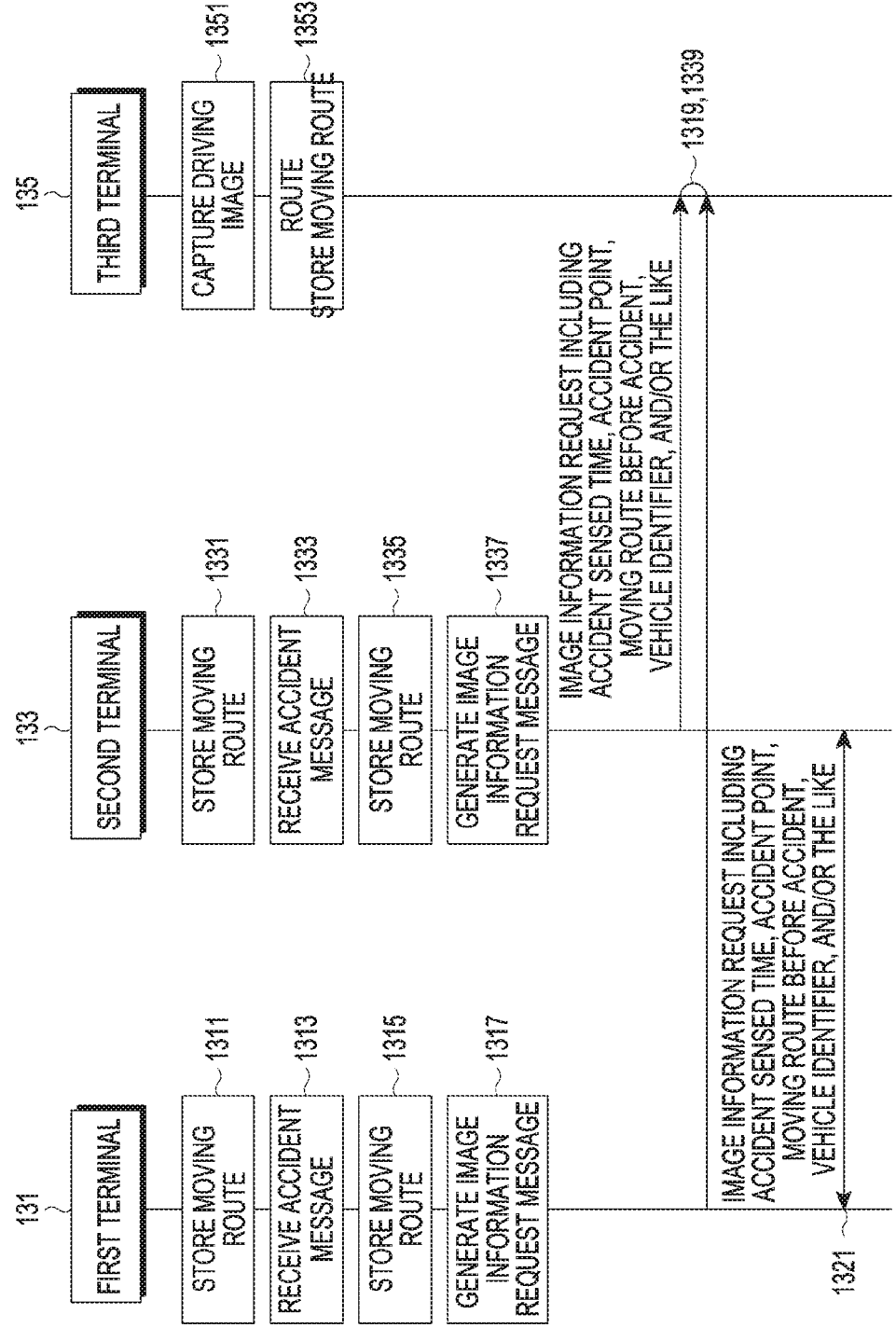
Figure 13B:
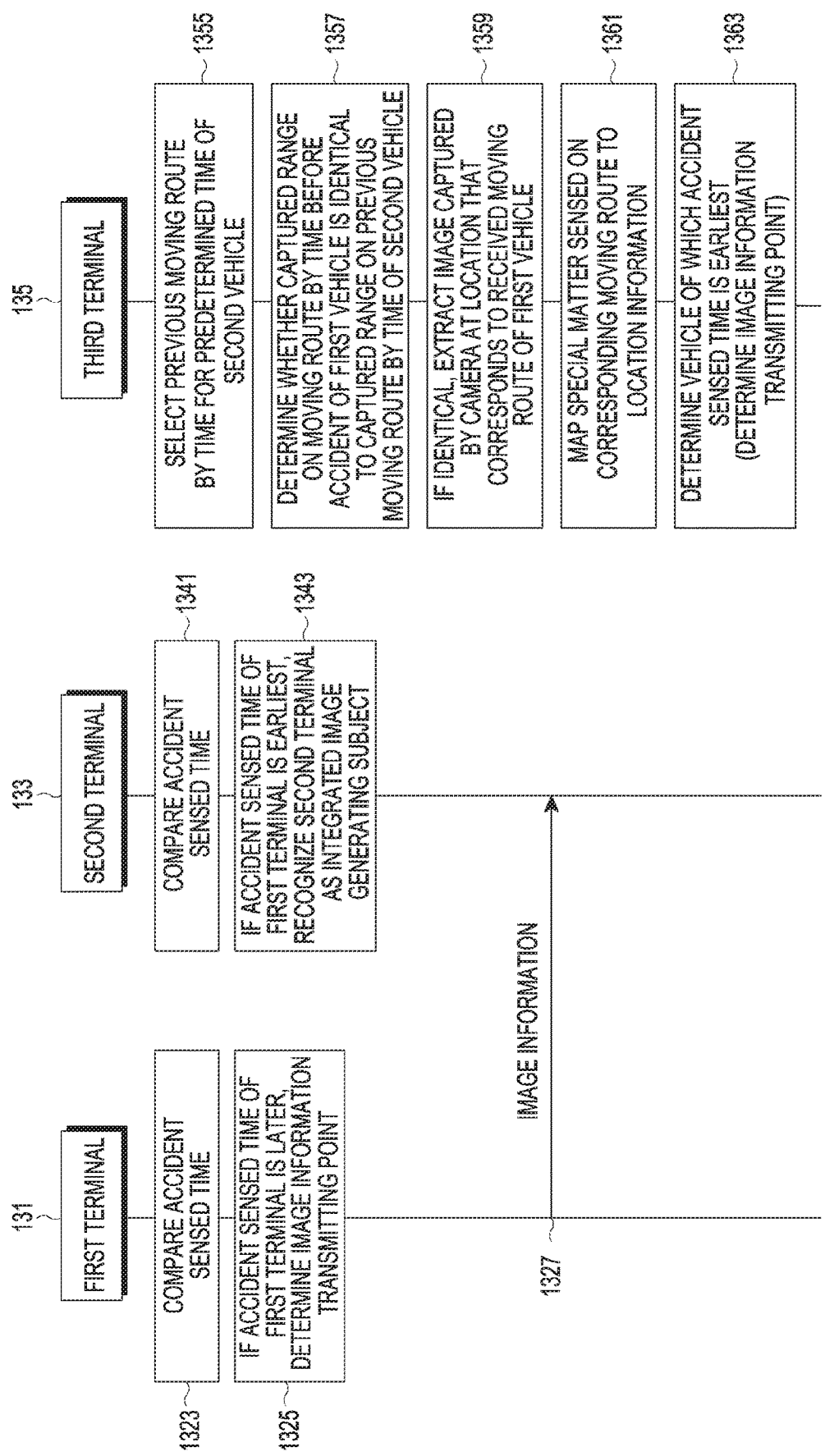
Figure 13C:
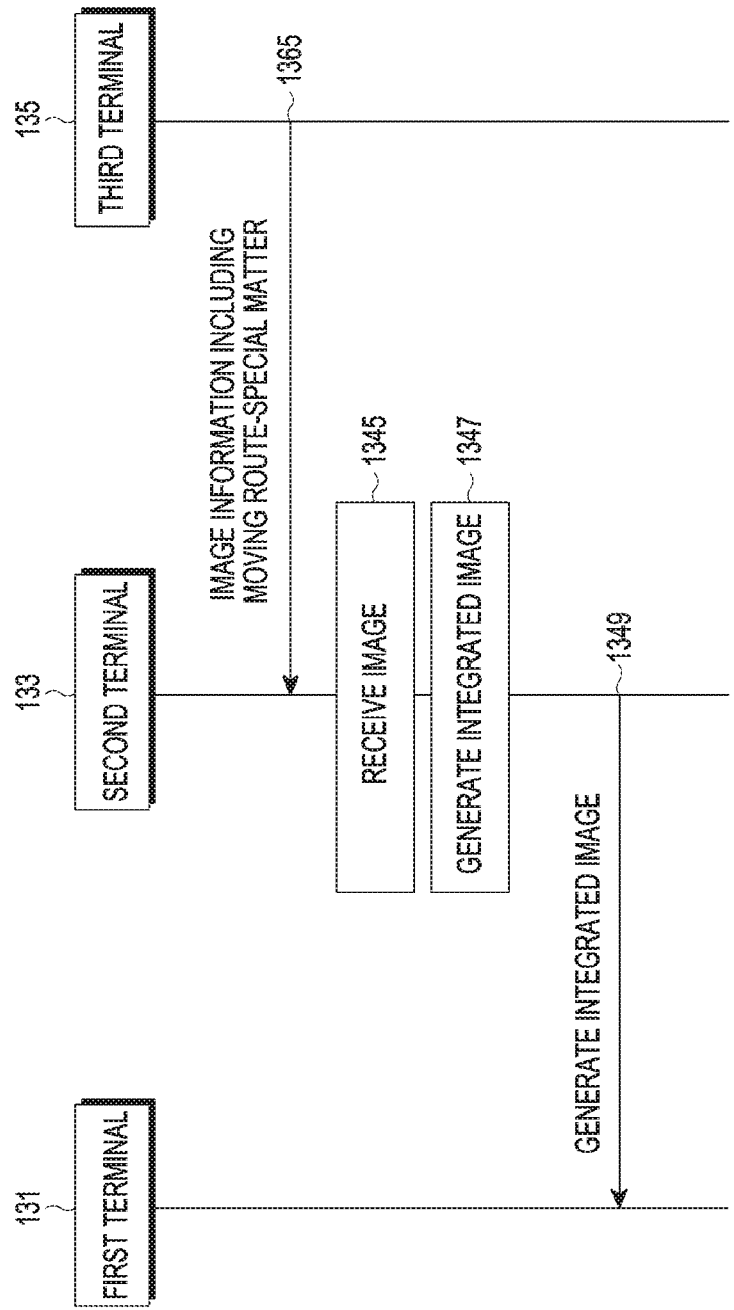

FIGS. 13a to 13c schematically illustrate still another example of a method of sharing image information related to the first vehicle in a communication system according to an embodiment of the present disclosure.

Referring to FIGS. 13a, 13b, and 13c, FIGS. 13a, 13b, and 13c are separately illustrated for convenience, however, it will be understood that FIGS. 13a, 13b, and 13c are connected figures indicating one embodiment.

In an example in FIGS. 13a to 13c, the first terminal 131 is the first terminal of the first vehicle, the second terminal 133 is the second terminal of the first vehicle, and the third terminal 135 is a terminal of the second vehicle. That is, an embodiment in FIGS. 13a to 13c indicates a method of sharing image information in a case that there are a plurality of first vehicles. So, in FIGS. 13a to 13c, the first and second terminals 131 and 133, and corresponding vehicles correspond to the first terminal and the first vehicle in embodiments as described above, respectively, and the third terminal 135 and a vehicle thereof correspond to the second terminal and the second vehicle in embodiments as described above, respectively.

Like the present embodiment, if there are a plurality of first vehicles, the second vehicle receives image information request messages from the plurality of first vehicles at the same time. This case results in overload on a wireless channel, so the present embodiment proposes a scheme in which a terminal of the second vehicle (i.e., the third terminal 135) transmits image information to a terminal of which accident sensed time is the earliest among terminals of the first vehicle (i.e., the first terminal 131 and the second terminal 133).

An operation of operations 1311 to 1317 and an operation of operations 1331 to 1337 in a method of sharing image information related to the first vehicle as shown in FIG. 13a are identical to an operation of operations 311 to 317 and an operation of operations 331 to 337 in a method of sharing image information related to the first vehicle as shown in FIG. 3, so a detailed description thereof will be omitted herein.

Referring to FIG. 13a, each of image information request messages generated in the first terminal 131 and the second terminal 133 may include accident sensed time, an accident point, and a moving route for predetermined time before an accident of a corresponding vehicle, identification information of the corresponding vehicle, and/or the like. Each of the first terminal 131, the second terminal 133, and the third terminal 135 transmits and receives an image information request message at operations 1319, 1321, and 1339. Each of the first terminal 131 and the second terminal 133 compares accident sensed time included in an image information request message received from other party terminal with accident sensed time of each of the first terminal 131 and the second terminal 133 at operations 1323 and 1341. In the present embodiment, it will be assumed that the accident sensed time of the second terminal 133 is earlier. If the accident sensed time of the second terminal 133 is the earliest according to the compared result at operation 1341, the second terminal 133 determines that the second terminal 133 is a subject which generates an integrated image at operation 1343. If the accident sensed time of the first terminal 131 is later according to the compared result at operation 1323, the first terminal 131 determines which terminal is a transmitting point at which image information will be transmitted (hereinafter, "image information transmitting point")(i.e., a subject generating an integrated image) at operation 1325. In the present embodiment, the first terminal 131 determines that an image information transmitting point is the second terminal 133, and transmits image information to the second terminal 133 at operation 1327. At this time, the image information transmitted to the second terminal 133 At this time, it is possible to extract and transmit image information which corresponds to a moving route for predetermined time before an accident as the image information transmitted to the second terminal 133, or it is possible to transmit a part of the extracted image as the image information transmitted to the second terminal 133.

Meanwhile, an operation of operations 1355 to 1361 in FIG. 13*b* is identical to an operation of operations 1235 to 1241 as described in FIG. 12, so a detailed description thereof will be omitted herein. The third terminal 1351 of the second vehicle identifies accident sensed time included in each of image information request messages received from the first terminal 131 and the second terminal 133, and determines that accident sensed time of the second terminal 133 is earlier. The third terminal 135 transmits image information to the second terminal 133 at operation 1363. The image information transmitted at operation 1363 may be image information including a moving route-special matter. The moving route-special matter may be selectively included. If the moving route-special matter is not included, operation 1361 may be omitted.

Meanwhile, the second terminal 133 receives image information at operation 1345 in FIG. 13*c*, generates an integrated image using image information which the second terminal 133 captures and image information received from the first and third terminals 131 and 133 at operation 1347, and transmits the integrated image to the first terminal 131 at operation 1349.

An operation of remaining operations which are not described in a method of sharing image information related to the first vehicle as shown in FIGS. 13*a* to 13*c* is identical to an operation as described in other examples of a method of sharing image information related to the first vehicle as described above, so a detailed description thereof will be omitted herein.

Still another example of a method of sharing image information related to the first vehicle in a communication system according to an embodiment of the present disclosure has been described with reference to FIGS. 13*a* to 13*c*, and still another example of a method of sharing image information related to the first vehicle in a communication system according to an embodiment of the present disclosure will be described with reference to FIGS. 14*a* and 14*b*.

Figure 14A:
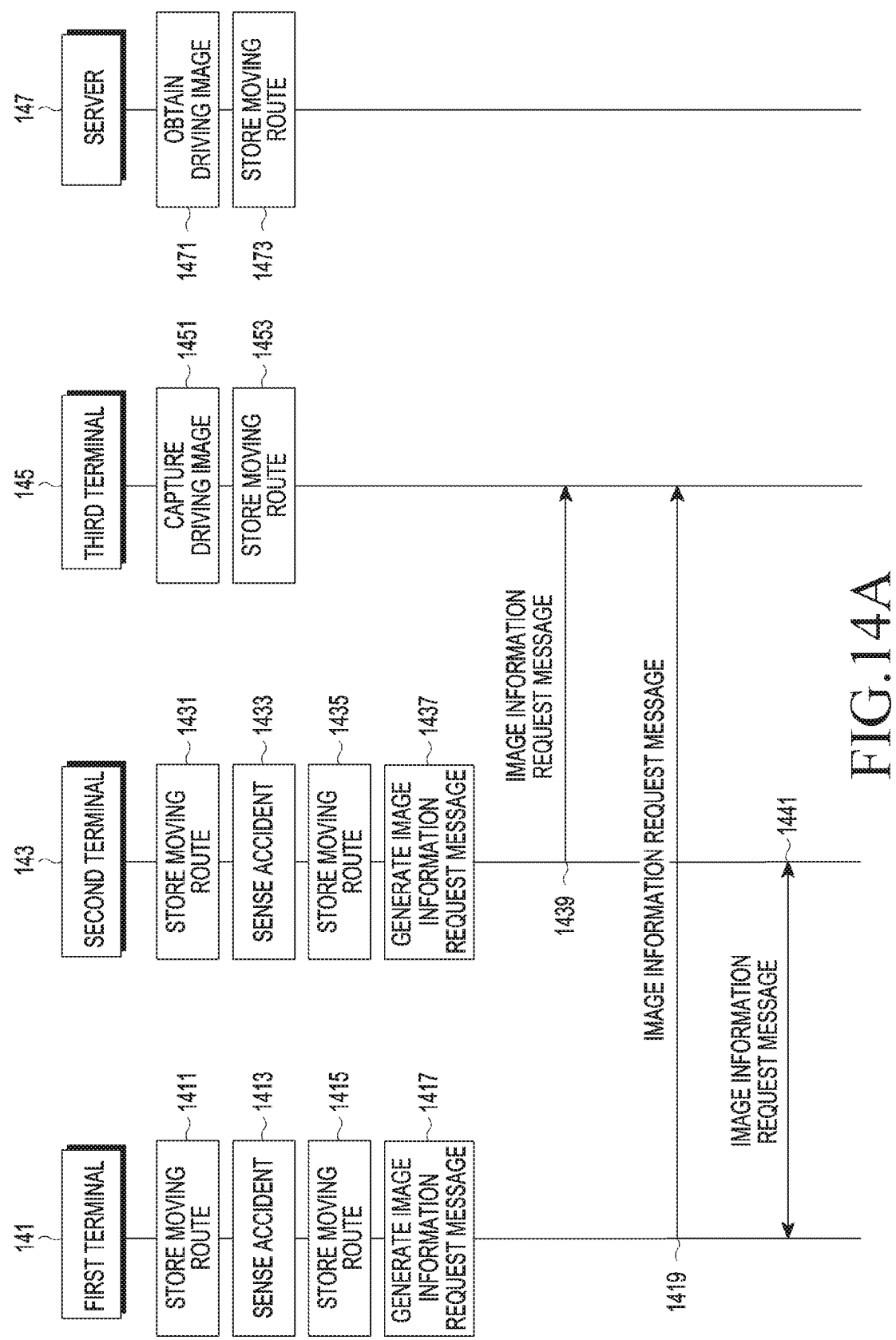
Figure 14B:
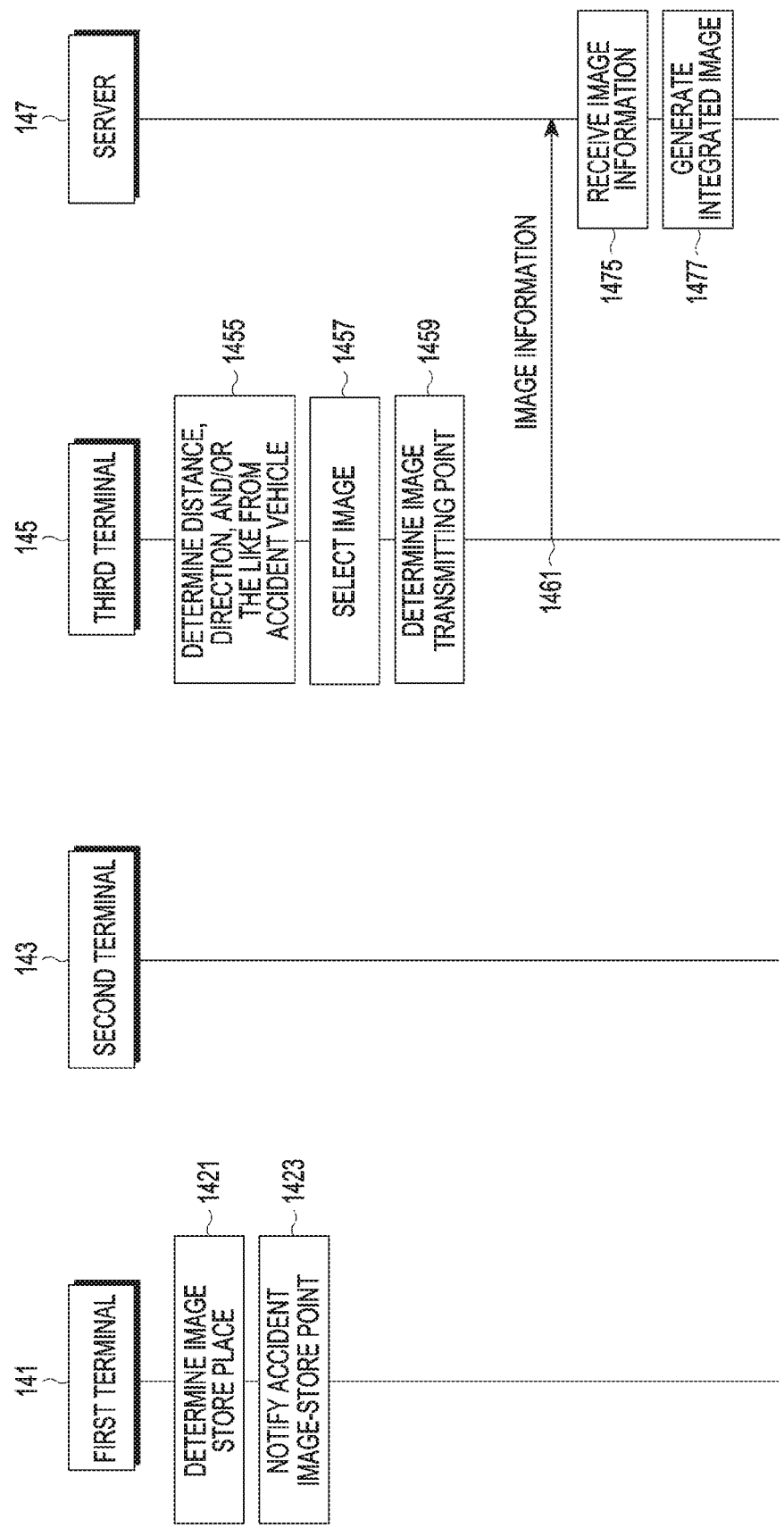

FIGS. 14*a* and 14*b* schematically illustrate still another example of a method of sharing image information related to the first vehicle in a communication system according to an embodiment of the present disclosure.

Referring to FIGS. 14*a* and 14*b*, FIGS. 14*a* and 14*b* are separately illustrated for convenience, however, it will be understood that FIGS. 14*a* and 14*b* are connected figures indicating one embodiment.

In an example in FIGS. 14*a* and 14*b*, the first terminal 141 is the first terminal of the first vehicle, the second terminal 143 is the second terminal of the first vehicle, the third terminal 145 is a terminal of the second vehicle, and a server 147 is a cloud server for receiving image information related to the first vehicle as described above. That is, an embodiment in FIGS. 14*a* and 14*b* indicates a method of sharing image information using a cloud server in a case that there are a plurality of first vehicles. So, in FIGS. 14*a* and 14*b*, the first and second terminals 141 and 143, and corresponding vehicles correspond to the first terminal and the first vehicle in embodiments as described above, respectively, and the third terminal 145 and a vehicle thereof correspond to the second terminal and the second vehicle in embodiments as described above, respectively. An operation of operations 1411 to 1417 and an operation of operations 1431 to 1437 in FIG. 14*a* are identical to an operation of operations 311 to 317 and an operation of operations 331 to 337 in a method of sharing image information related to the first vehicle as shown in FIG. 3, so a detailed description thereof will be omitted herein.

Referring to FIG. 14*a*, each of the first terminal 141 and the second terminal 143 transmits an image information request message at operations 1419 and 1439. At this time, the image information request message may include accident sensed time, address information and authentication information for accessing a server 147, and/or the like. Further, an image information request message generated from each of the first terminal 141 and the second terminal 143 may include accident sensed time, an accident point, and a moving route for predetermined time before an accident of a corresponding vehicle, identification information of the corresponding vehicle, and/or the like. Although not shown, the first terminal 141 and the second terminal 143 compare accident sensed time each other. In the present embodiment, it will be assumed that accident sensed time of the second terminal 143 is earlier. The third terminal 145 of the second vehicle identifies accident sensed time from an image information request message received from each of the first terminal 141 and the second terminal 143, and determines that the accident sensed time of the second terminal 143 is earlier. The first terminal 141 may determine that a point at which image information is stored is the server 147 at operation 1421, and broadcast a message for notifying that the point at which the image information is stored is the server 147 at operation 1423. An operation of operations 1421 and 1423 may be omitted. The third terminal 145 selects image information to be transmitted and determines that a transmitting point is the server 147 at operations 1455 to 1459, and transmits image information to the server 147 at operation 1461.

An operation of remaining operations which are not described in a method of sharing image information related to the first vehicle as shown in FIGS. 14*a* and 14*b* is identical to other examples of a method of sharing image information related to the first vehicle as described above, so a detailed description thereof will be omitted herein.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for sharing a driving image in a first terminal, the method comprising:
storing a moving route by time of a first vehicle which communicates with the first terminal via a short range communication scheme;
receiving a first message for notifying an occurrence of an accident or a hazardous situation from the first vehicle;
selecting a first moving route for predetermined time from the stored moving route and obtaining a first driving image of the first vehicle corresponding to the first moving route for the predetermined time, based on the first message; and
transmitting a second message for requesting image information related to the first moving route;
receiving the image information related to the first moving route for at least part of the predetermined time from a second terminal; and
integrating the first driving image of the first vehicle and an image corresponding to the image information related to the first moving route into an integrated image.

2. A terminal for sharing a driving image, the terminal comprising:
at least one processor configured to:
store a moving route by time of a first vehicle which communicates with the terminal via a short range communication scheme,
receive a first message for notifying an occurrence of an accident or a hazardous situation from the first vehicle,
select a first moving route for a predetermined time from the stored moving route and obtain a first driving image of the first vehicle corresponding to the first moving route for the predetermined time, based on the first message, and
transmit a second message for requesting image information related to the first moving route,
receive the image information related to the first moving route for at least part of the predetermined time from a second terminal, and
integrate the first driving image of the first vehicle and an image corresponding to the image information related to the first moving route into an integrated image.

3. The method of claim 1, wherein the moving route includes location information by time of the first vehicle,
wherein the moving route is selected for a predetermined time before the accident, and
wherein the location information includes at least one of a latitude, a longitude, an altitude, a speed, Global Positioning System (GPS) information, a driving road, a coordinate value on a map, a driving lane, and a driving heading of the first vehicle.

4. The method of claim 1, wherein the second message includes at least one of accident sensed time at which the occurrence of the accident is sensed, an accident point, the first moving route, and identification information of the first vehicle.

5. The method of claim 1, wherein the image information includes a moving route-special matter sensed on a driving route of a second vehicle which communicates with the second terminal.

6. The terminal of claim 2, wherein the image information received from the second terminal includes a moving route-special matter sensed on a driving route of a second vehicle which communicates with the second terminal.

7. The method of claim 1, wherein the image information related to the first moving route is generated by the second terminal which receives the second message or a Closed Circuit Television (CCTV), and
wherein the generated image information is transmitted to an outer server.

8. The terminal of claim 2, wherein the moving route includes location information by time of the first vehicle,
wherein the moving route is selected for the predetermined time before the accident, and
wherein the location information includes at least one of a latitude, a longitude, an altitude, a speed, Global Positioning System (GPS) information, a driving road, a coordinate value on a map, a driving lane, and a driving heading of the first vehicle.

9. The terminal of claim 2, wherein the second message includes at least one of accident sensed time at which the occurrence of the accident is sensed, an accident point, the first moving route, and identification information of the first vehicle.

10. The terminal of claim 2, wherein the image information related to the first moving route is generated by the second terminal which receives the second message or a Closed Circuit Television (CCTV), and
wherein the generated image information is transmitted to an outer server.

* * * * *